US009547225B2

(12) United States Patent
Ohno et al.

(10) Patent No.: US 9,547,225 B2
(45) Date of Patent: Jan. 17, 2017

(54) IMAGE DISPLAY DEVICE WHICH REDUCES MUTUAL INTERFERENCE OF LIGHT REFLECTED BY A SCREEN

(71) Applicant: Panasonic Intellectual Property Management Co., Ltd., Osaka (JP)

(72) Inventors: Hiroshi Ohno, Osaka (JP); Kazuhiko Yamanaka, Toyama (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 14/744,093

(22) Filed: Jun. 19, 2015

(65) Prior Publication Data

US 2015/0286120 A1 Oct. 8, 2015

Related U.S. Application Data

(63) Continuation of application No. PCT/JP2013/004413, filed on Jul. 19, 2013.

(30) Foreign Application Priority Data

Dec. 26, 2012 (JP) .................................. 2012-282169

(51) Int. Cl.
*G03B 21/20* (2006.01)
*G02B 26/10* (2006.01)
(Continued)

(52) U.S. Cl.
CPC .............. *G03B 21/204* (2013.01); *F21V 9/16* (2013.01); *F21V 13/14* (2013.01); *G02B 26/10* (2013.01);
(Continued)

(58) Field of Classification Search
CPC ..................... B60K 2350/2047; G03B 21/204; H04N 9/3129; G09G 3/02; G02B 26/101; G02B 26/10
See application file for complete search history.

(56) References Cited

U.S. PATENT DOCUMENTS 5,463,468 A * 10/1995 Takanashi .............. G09G 3/002
348/195
5,502,490 A * 3/1996 Takanashi .............. G09G 3/002
348/195
(Continued)

FOREIGN PATENT DOCUMENTS

JP  2008-529069  7/2008
JP  2010-527464  8/2010
(Continued)

OTHER PUBLICATIONS

International Search Report of PCT application No. PCT/JP2013/004413 dated Oct. 1, 2013.

*Primary Examiner* — Bao-Luan Le
(74) *Attorney, Agent, or Firm* — McDermott Will & Emery LLP

(57) ABSTRACT

An image display device which reduces speckles in an image display device using a laser source includes: a laser source which emits excitation light; a collecting lens which collects the excitation light; a deflecting element which scans the excitation light collected by the collecting lens; and a light conversion panel which converts a wavelength of the excitation light scanned by the deflecting element and emits fluorescence, wherein the light conversion panel includes a plurality of phosphor layers which are planarly disposed, absorb the excitation light, and emit the fluorescence.

10 Claims, 31 Drawing Sheets

(51) Int. Cl.
  *G09G 3/02* (2006.01)
  *H04N 9/31* (2006.01)
  *F21V 9/16* (2006.01)
  *F21V 13/14* (2006.01)
  *G02B 27/48* (2006.01)

(52) U.S. Cl.
  CPC .............. *G02B 26/101* (2013.01); *G09G 3/02* (2013.01); *H04N 9/3129* (2013.01); *H04N 9/3138* (2013.01); *G02B 27/48* (2013.01)

(56) References Cited

U.S. PATENT DOCUMENTS

| | | | | |
|---|---|---|---|---|
| 6,329,966 B1 * | 12/2001 | Someya | .................... | G09G 3/02 345/22 |
| 7,357,512 B2 * | 4/2008 | Tan | ......................... | G03B 21/10 348/205 |
| 7,474,286 B2 * | 1/2009 | Hajjar | ...................... | G09G 3/02 345/81 |
| 7,511,771 B2 * | 3/2009 | Stern | ...................... | G03B 21/10 348/744 |
| 7,560,707 B2 * | 7/2009 | Bratkovski | ............ | B82Y 20/00 250/458.1 |
| 7,791,561 B2 * | 9/2010 | Hajjar | ................... | G03B 21/567 345/32 |
| 8,000,005 B2 * | 8/2011 | Kindler | .................. | G03B 21/56 345/84 |
| 8,038,822 B2 * | 10/2011 | Kindler | ................ | G02B 26/123 156/245 |
| 8,203,785 B2 * | 6/2012 | Kindler | .................. | G03B 21/56 345/84 |
| 8,232,957 B2 * | 7/2012 | Hajjar | ...................... | G09G 3/02 345/102 |
| 8,233,217 B2 * | 7/2012 | Kindler | .................. | G03B 21/56 345/84 |
| 8,480,280 B2 * | 7/2013 | Kleppinger | ............. | H01J 29/28 362/600 |
| 8,485,669 B2 * | 7/2013 | Katou | ................ | G02B 26/0833 353/122 |
| 8,591,042 B1 * | 11/2013 | Hajjar | .................... | G03B 21/13 348/744 |
| 8,698,713 B2 * | 4/2014 | Hajjar | ................... | G03B 21/567 345/32 |
| 8,803,772 B2 * | 8/2014 | Kent | .................... | G03B 21/567 345/32 |
| 2005/0083572 A1 * | 4/2005 | Shimizu | ............... | G02B 3/0025 359/460 |
| 2006/0119804 A1 | 6/2006 | Dvorkis et al. | | |
| 2006/0119805 A1 | 6/2006 | Wittenberg et al. | | |
| 2006/0126023 A1 * | 6/2006 | Tan | ......................... | G03B 21/10 353/31 |
| 2006/0221021 A1 * | 10/2006 | Hajjar | .................. | G03B 21/567 345/84 |
| 2006/0221022 A1 * | 10/2006 | Hajjar | ...................... | G09G 3/02 345/84 |
| 2006/0227087 A1 * | 10/2006 | Hajjar | ...................... | G09G 3/02 345/84 |
| 2007/0014318 A1 * | 1/2007 | Hajjar | ...................... | B82Y 10/00 372/9 |
| 2007/0097501 A1 * | 5/2007 | Stern | ...................... | G03B 21/10 359/453 |
| 2007/0228927 A1 * | 10/2007 | Kindler | .................. | G03B 21/56 313/495 |
| 2008/0048936 A1 * | 2/2008 | Powell | ................. | G02B 3/0056 345/55 |
| 2008/0291140 A1 * | 11/2008 | Kent | .................... | G03B 21/567 345/83 |
| 2009/0001272 A1 | 1/2009 | Hajjar | | |
| 2009/0009732 A1 * | 1/2009 | Maeda | ............... | G02B 26/0841 353/99 |
| 2009/0116107 A1 * | 5/2009 | Kindler | ................. | G02B 26/123 359/457 |
| 2009/0153582 A1 * | 6/2009 | Hajjar | ...................... | G09G 3/02 345/592 |
| 2009/0174632 A1 * | 7/2009 | Hajjar | ...................... | G09G 3/02 345/81 |
| 2010/0097678 A1 | 4/2010 | Hajjar et al. | | |
| 2011/0109529 A1 * | 5/2011 | Hajjar | ................... | G03B 21/567 345/32 |
| 2011/0228232 A1 * | 9/2011 | Sakata | ................... | G02B 7/008 353/31 |
| 2012/0019788 A1 * | 1/2012 | Katou | ................ | G02B 26/0833 353/33 |
| 2012/0218417 A1 * | 8/2012 | Bilger | ................... | G03B 21/567 348/164 |
| 2013/0050981 A1 * | 2/2013 | Yang | ................... | G03B 21/204 362/84 |
| 2013/0088689 A1 * | 4/2013 | Lin | ...................... | G03B 21/204 353/31 |
| 2014/0071403 A1 | 3/2014 | Hajjar | | |
| 2014/0362300 A1 | 12/2014 | Hajjar | | |

FOREIGN PATENT DOCUMENTS

| | | |
|---|---|---|
| JP | 2010-533307 | 10/2010 |
| JP | 2011-040537 | 2/2011 |
| JP | 2011-164537 | 8/2011 |
| WO | 2011/026005 | 3/2011 |
| WO | 2011/092843 | 8/2011 |

* cited by examiner

IMAGE DISPLAY DEVICE WHICH REDUCES MUTUAL INTERFERENCE OF LIGHT REFLECTED BY A SCREEN

BACKGROUND OF THE INVENTION

1. Field of the Invention

The present disclosure relates to image display devices used in devices such as portable projectors, stationary projectors, and head-up displays for vehicles, and relates also to light conversion panels used in the image display devices.

2. Description of the Related Art

FIG. 26 and FIG. 27 illustrate conventional image display device 500 of this type. Image display device 500 includes: first laser source 501 which emits red light; second laser source 502 which emits green light; third laser source 503 which emits blue light; collecting lenses 504 which collect red light, green light, and blue light; and scanning assembly 506 which includes deflecting element 505 for scanning the red light, green light, and blue light collected by collecting lenses 504 and projects the light scanned by deflecting element 505.

Patent Literature 1 (PTL 1) is an example disclosing such an image display device.

CITATION LIST

Patent Literature

PTL 1: Japanese Unexamined Patent Application Publication (Translation of PCT Application) No. 2008-529069

SUMMARY OF THE INVENTION

Conventional image display device 500 using the laser sources has a problem of speckles.

In more detail, when scanning assembly 506 in the conventional structure projects light on a screen or the like as an image, light reflected off the screen interferes each other. This is because the light reaching the screen from any one of first laser source 501, second laser source 502, and third laser source 503 has a uniform wavelength and phase. As a result, a person seeing the image projected on the screen perceives glare. In other words, speckles occur.

In view of this, it is an object of the present disclosure to reduce speckles in an image display device which uses a laser source.

To achieve this object, an image display device according to the present disclosure includes: a laser source which emits excitation light; a collecting lens which collects the excitation light; a deflecting element which scans the excitation light collected by the collecting lens; and a light conversion panel which converts a wavelength of the excitation light scanned by the deflecting element and emits fluorescence. The light conversion panel includes a plurality of phosphor layers which are planarly disposed, absorb the excitation light, and emit the fluorescence.

Such a structure allows the excitation light from the laser source to be converted to fluorescence by the light conversion panel before being emitted, and thus the light has a wider range of wavelengths and phases. This reduces mutual interference of light reflected off the screen, thus reducing speckles.

DETAILED DESCRIPTION OF THE PREFERRED EMBODIMENTS

Embodiment 1

Hereinafter, an image display device and a light conversion panel used in the image display device according to Embodiment 1 will be described with reference to the drawings.

Figure 1:
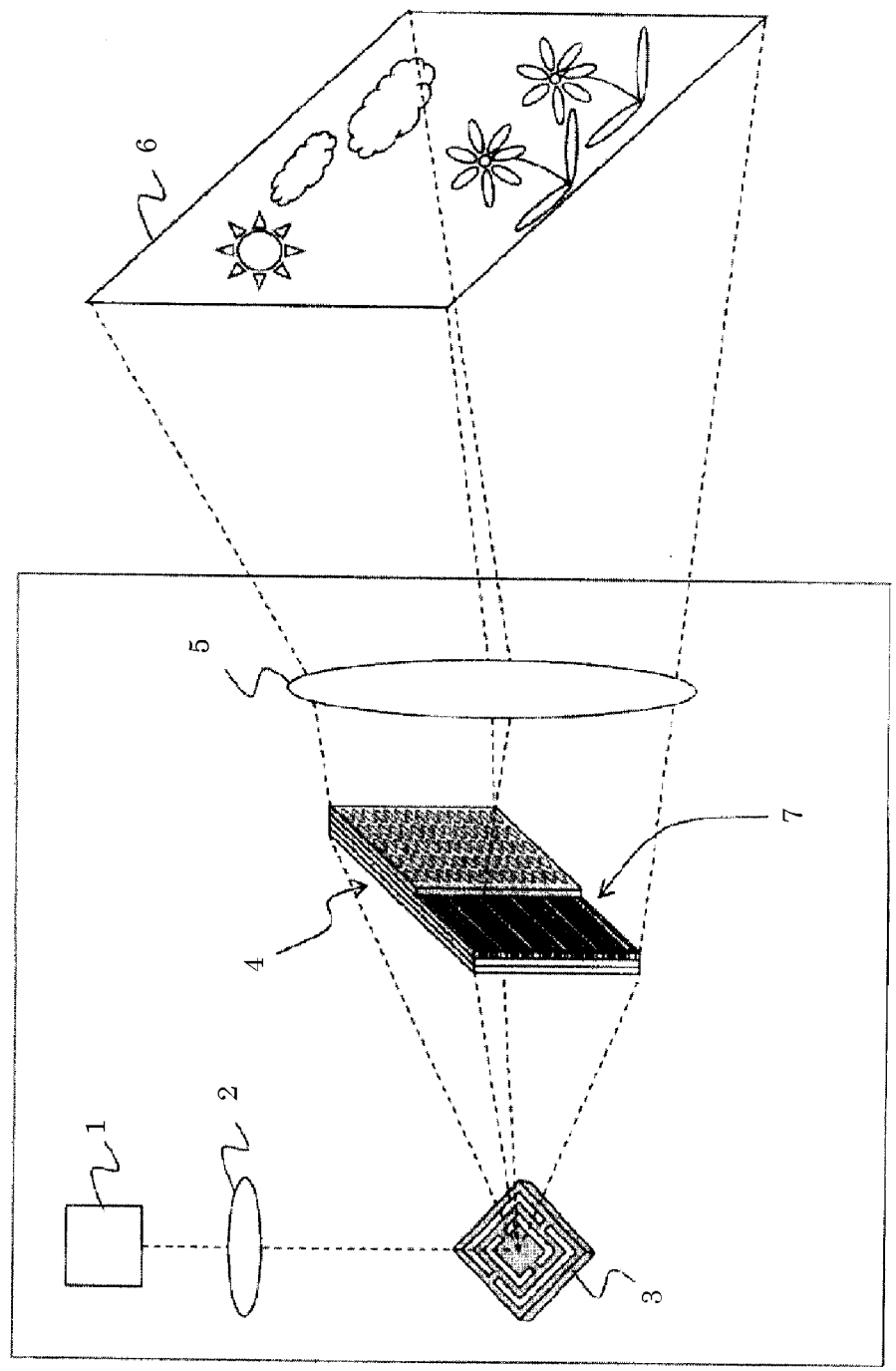
FIG. 1 is a schematic view illustrating a structure of an image display device according to Embodiment 1.

FIG. 1 is a schematic view illustrating a structure of the image display device according to Embodiment 1. The image display device according to Embodiment 1 includes laser source 1, collecting lens 2, deflecting element 3, light conversion panel 4, and projector lens 5. Laser source 1 emits excitation light (laser) which is near-ultraviolet light. Collecting lens 2 is disposed on the light-emission side of laser source 1 and collects the excitation light. Deflecting element 3 is disposed on the light-collection side of collecting lens 2 and scans the excitation light (i.e., scans the excitation light collected by collecting lens 2). Deflecting element 3 is a movable reflecting mirror, for example. Light conversion panel 4 converts the wavelength of the near-ultraviolet light (i.e., excitation light (laser)) scanned by deflecting element 3 and emits fluorescence. Projector lens 5 projects the light emitted from light conversion panel 4.

The light from projector lens 5 is projected on screen 6.

Here, light conversion panel 4 includes a plurality of phosphor layers 7 which are planarly disposed, absorb the excitation light, and emit fluorescence.

Such a structure allows the excitation light from laser source 1 to be converted to fluorescence by light conversion panel 4 before being emitted, and thus light has a wider range of wavelengths and phases. This reduces mutual interference of light reflected off screen 6, thus reducing speckles.

Hereinafter, the more specific structure will be described.

Figure 2A:
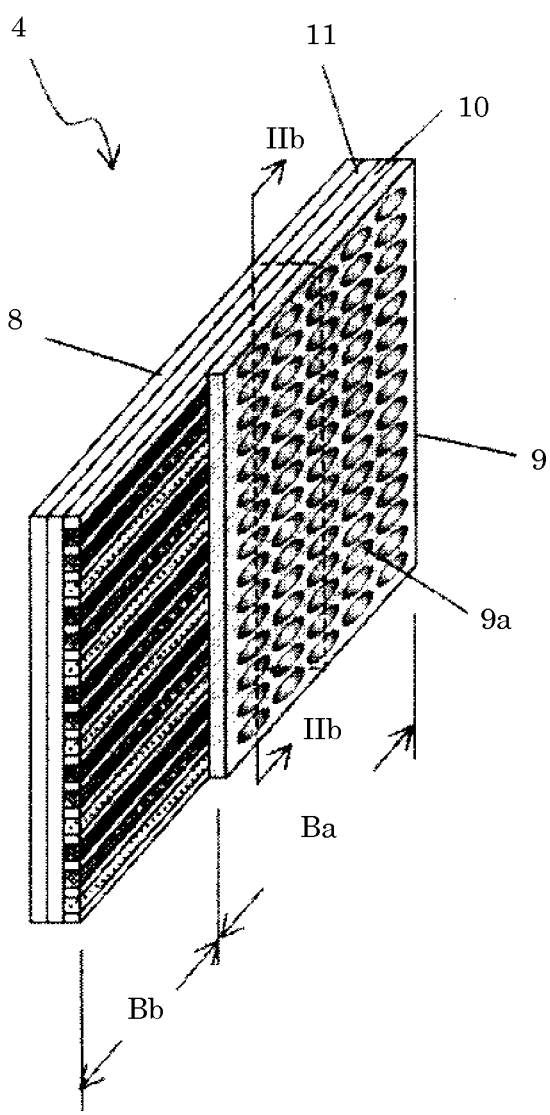
FIG. 2A is a partially cutaway perspective view of a light conversion panel according to Embodiment 1.
Figure 2B:
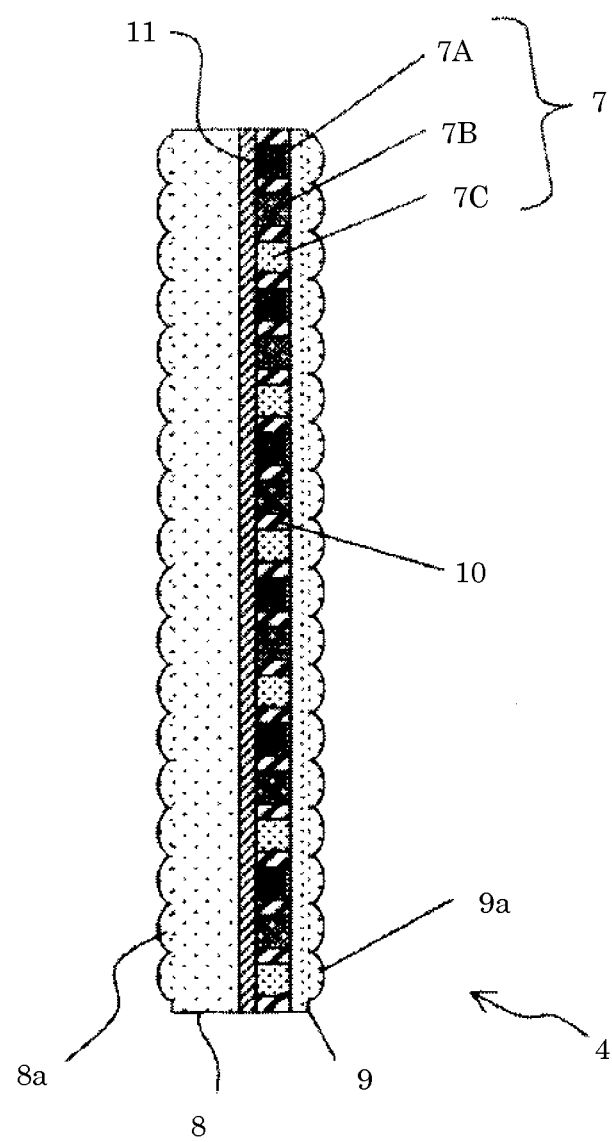
FIG. 2B is a cross-sectional view along line IIb-IIb in FIG. 2A.

Light conversion panel 4 includes a first optical element (here, first microlens array 8) which guides the excitation light to phosphor layers 7 and a second optical element (here, second microlens array 9) which transmits fluorescence. Light conversion panel 4 further includes transparent substrate 11 which is disposed between phosphor layers 7 and the first optical element and transmits the excitation light. More specifically, as illustrated in FIG. 2A and FIG. 2B, light conversion panel 4 includes: first microlens array 8 which receives the excitation light scanned by deflecting element 3; transparent substrate 11 which transmits the excitation light collected by first microlens array 8 to phosphor layers 7; and second microlens array 9 which transmits the fluorescence from phosphor layers 7 to projector lens 5. That is to say, phosphor layers 7 are disposed between first microlens array 8 and second microlens array 9.

Region Ba in FIG. 2A illustrates the surface of light conversion panel 4 with second microlens array 9 disposed. Region Bb in FIG. 2A illustrates light conversion panel 4 with second microlens array 9 removed for the purpose of illustration of the present embodiment. FIG. 2B is a schematic cross-sectional view along line IIb-IIb in FIG. 2A.

Each phosphor layer 7 includes: red phosphor layer 7A which absorbs near-ultraviolet light and emits red light; green phosphor layer 7B which absorbs near-ultraviolet light and emits green light; and blue phosphor layer 7C which absorbs near-ultraviolet light and emits blue light. Including red phosphor layer 7A, green phosphor layer 7B, and blue phosphor layer 7C allows projection of a full-colored image onto screen 6.

Red phosphor layer 7A contains a phosphor which has carriers excited by the excitation light from laser source 1 and emits red fluorescence. Green phosphor layer 7B contains a phosphor which has carriers excited by the excitation light from laser source 1 and emits green fluorescence. Blue phosphor layer 7C contains a phosphor which has carriers excited by the excitation light from laser source 1 and emits blue fluorescence. More specifically, the red phosphor includes one or more of the following types of phosphors: Eu-activated (Sr, Ca) $AlSiN_3$ phosphor; Eu-activated $CaAlSiN_3$ phosphor; Eu- and Sm-activated $LaW_3O_{12}$ phosphor; and Eu-activated $LiW_2O_8$ phosphor, for example. The red phosphor is combined with a binder such as silicone or glass to make red phosphor layer 7A. Similarly, the green phosphor includes Ce-activated $Y_3(Ga, Al)_5O_{12}$ phosphor or Eu-activated β-SiAlON (β-SiAlON: Eu) phosphor, for example. As for the blue phosphor, Eu-activated $BaMgAl_{10}O_{17}$ phosphor, Eu-activated $Sr_3MgSi_2O_8$ phosphor, or Eu-activated $(Sr, Ca, Ba, Mg)_{10}(PO_4)_6C_{12}$ phosphor can be selected, for example.

Furthermore, other than the above-described rare-earth phosphors, the red, green, and blue phosphors may be core/shell quantum dot phosphors, for example, which are formed from a compound semiconductor such as cadmium selenide (CdSe), zinc selenide (ZnSe), zinc sulfide (ZnS), or indium phosphide (InP) and emit fluorescence in red, green, and yellow.

Disposed between phosphor layers 7 (e.g., between red phosphor layer 7A and green phosphor layer 7B) is spacer 10 which includes a high thermal conducting material having a thermal conductivity higher than that of phosphor layers 7.

Disposing such spacer 10 enables efficient dissipation, to the outside of phosphor layers 7, of heat generated when phosphor layers 7 absorb the near-ultraviolet light emitted from laser source 1 and emit fluorescence.

For the high thermal conducting material, at least one of copper, aluminum alloy, magnesium alloy, silicon carbide, zinc oxide, aluminum nitride, and diamond can be used. More restrictively, the high thermal conducting material includes at least one of zinc oxide, aluminum nitride, and diamond.

For spacer 10, it is also beneficial to use a highly reflective material having a high reflectance in the range of wavelengths of fluorescence spectrum generated by phosphors (i.e., a material having a reflectance higher than that of phosphor layers 7).

Disposing such spacer 10 reduces absorption of fluorescence generated by phosphor layers 7 and allows the fluorescence to be efficiently guided to second microlens array 9.

Silver, aluminum, or an alloy of these, for example, can be used for the highly reflective material.

It is preferable that spacer 10 be manufactured by forming, on the surface of the high thermal conducting material having a thermal conductivity higher than that of the phosphor layers, a film including a highly reflective material having a high reflectance in the range of wavelengths of fluorescence spectrum generated by phosphors. This way, the above-described two advantageous effects can be achieved.

It is preferable that transparent substrate 11 include a high thermal conducting material having a thermal conductivity higher than that of the phosphor layers.

Disposing such transparent substrate 11 enables efficient dissipation, to the outside of phosphor layers 7, of heat generated when phosphor layers 7 absorb the near-ultraviolet light emitted from laser source 1 and emit fluorescence.

For the high thermal conducting material, zinc oxide, aluminum nitride, or diamond can be used, for example.

For first microlens array 8 and second microlens array 9, soda lime, borosilicate crown glass (BK7), or synthetic quartz can be used, for example.

First microlens array 8 is thicker than second microlens array 9. The reason is to increase the excitation light-fluorescence conversion efficiency while maintaining the overall thickness to maintain the strength of light conversion panel 4. Here, the excitation light-fluorescence conversion efficiency is a ratio of the intensity of the excitation light which enters the light conversion panel to the intensity of the fluorescence emitted from the light conversion panel. More specifically, the excitation light from laser source 1 is almost-parallel light and thus can be efficiently collected to enter phosphor layers 7 even when first microlens array 8 is made thicker. On the other hand, the fluorescence from phosphor layers 7 is emitted in all directions. Therefore, it is necessary to make second microlens array 9 as thin as possible so that second microlens array 9 can take in the fluorescence more efficiently. Accordingly, the overall thickness of light conversion panel 4 can be a predetermined thickness by thickening first microlens array 8 and thinning second microlens array 9. This prevents a decrease in the strength of light conversion panel 4.

First microlens array 8 has a focal length longer than that of second microlens array 9. The reason is to increase the excitation light-fluorescence conversion efficiency while maintaining the strength of light conversion panel 4 by thickening first microlens array 8 and thinning second microlens array 9 as described above.

In FIGS. 2A and 2B, red phosphor layers 7A, green phosphor layers 7B, and blue phosphor layers 7C are linearly disposed. More specifically, they are disposed in parallel straight lines. Furthermore, each of microlenses 8a included in first microlens array 8 and each of microlenses 9a included in second microlens array 9 are disposed on a plane in correspondence with the lines of phosphor layers 7. Here, three microlenses 8a and three microlenses 9a disposed in a direction perpendicular to the straight lines correspond to three colors and make up a full-colored unit pixel.

Figure 3A:
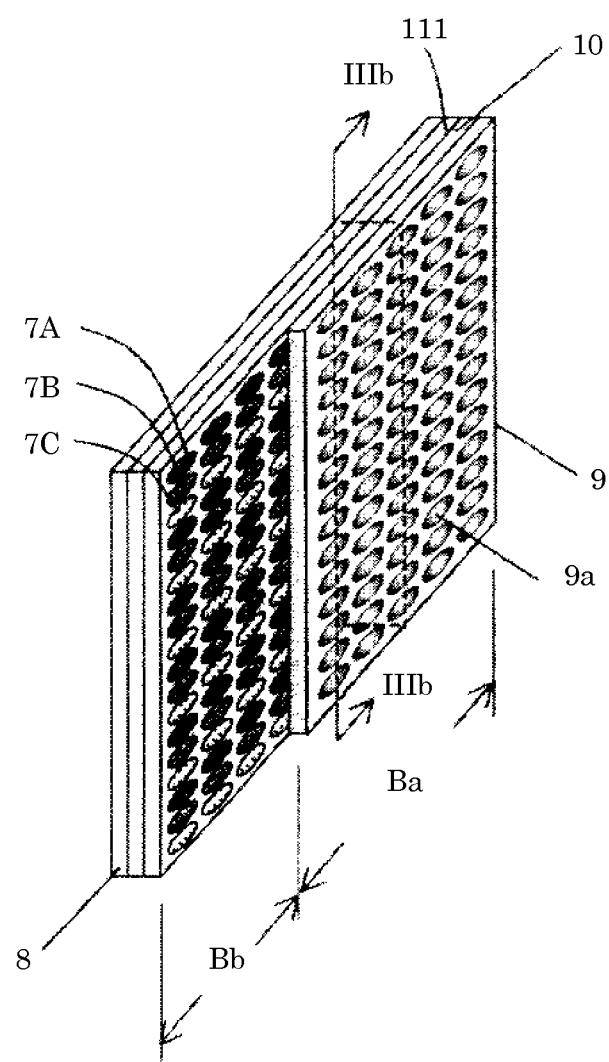
FIG. 3A is a partially cutaway perspective view illustrating another example of a light conversion panel according to Embodiment 1.
Figure 3B:
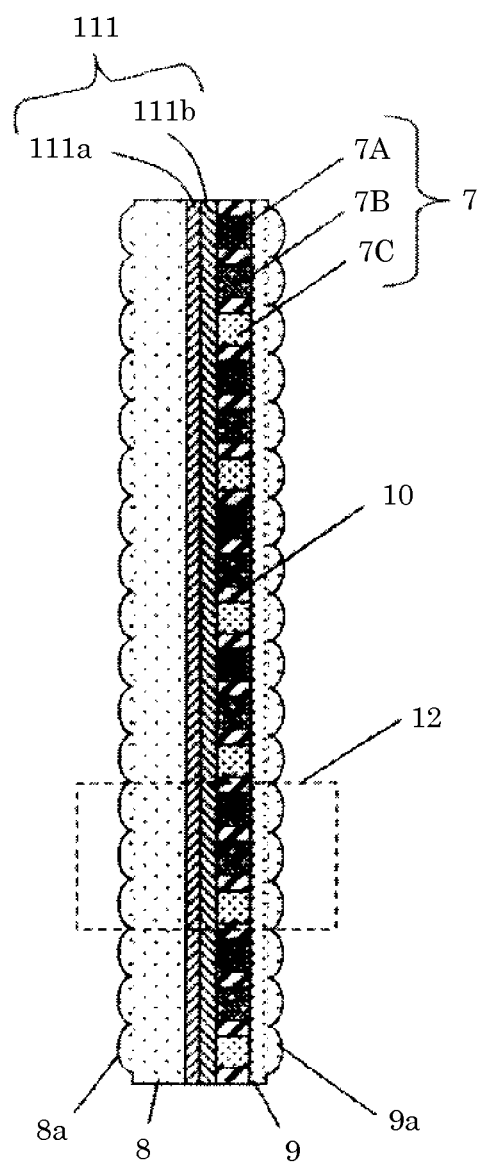
FIG. 3B is a cross-sectional view along line Mb-Mb in FIG. 3A.
Figure 4A:
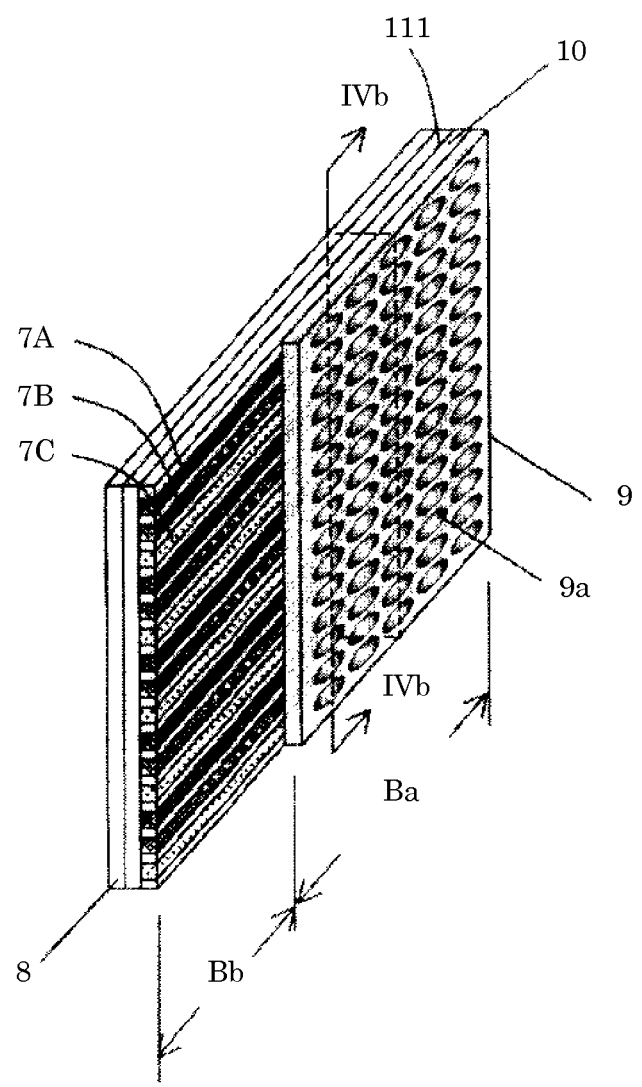
FIG. 4A is a partially cutaway perspective view illustrating another example of a light conversion panel according to Embodiment 1.
Figure 4B:
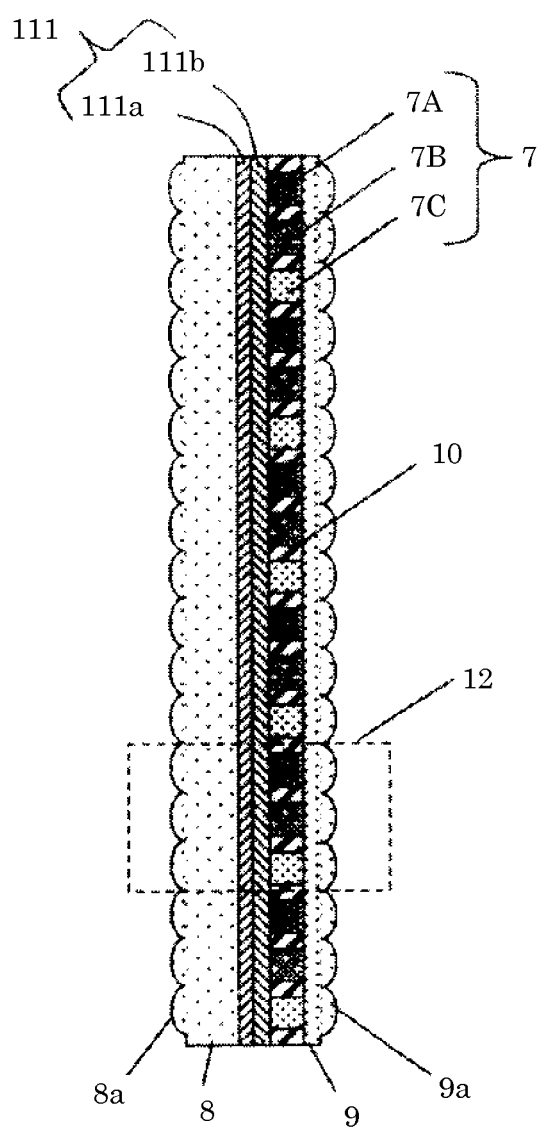
FIG. 4B is a cross-sectional view along line IVb-IVb in FIG. 4A.

In the present embodiment, red phosphor layers 7A, green phosphor layers 7B, and blue phosphor layers 7C are disposed in parallel straight lines in the horizontal direction. However, they may be disposed in straight lines in the vertical direction. As illustrated in FIG. 3A, they may also be formed in dots and disposed in positions corresponding to microlenses 8a and microlenses 9a. However, it is preferable in terms of efficiency that the shape of microlenses 8a and microlenses 9a be elliptical to match with the shape of the beam emitted from laser source 1.

It is sufficient as long as the light emitted from laser source 1 has a wavelength which enables efficient excitation of the RGB phosphors. Considering stokes loss at the time of wavelength conversion and the excitation efficiency of the phosphors, it is preferable that the center wavelength of the excitation light emitted from laser source 1 be in a range from 350 nm to 430 nm. Further considering the luminous efficacy of laser source 1, it is most preferable that the center wavelength be in a range from 400 nm to 420 nm. Such a structure enables reduction of stokes loss, that is, difference in energy between excitation light and fluorescence, while increasing the efficiency of conversion from excitation light to fluorescence. Moreover, it is preferable that the center wavelength of the fluorescence emitted from the red phosphors, green phosphors, and blue phosphors be in a range from 590 nm to 670 nm, 500 nm to 590 nm, and 430 nm to 500 nm, respectively. Such a structure increases color reproducibility of the image display device.

Although omitted from FIG. 1, the image display device includes a power source which is capable of modulation drive and drives laser source 1, a power source which is capable of modulation drive and drives deflecting element 3, and a control circuit which generates and controls a modulated signal. Deflecting element 3 is controlled according to a control signal to change the angle of reflection in X-axis and Y-axis directions so that a laser scans over light conversion panel 4. Synchronization of scanning by deflecting element 3 and modulation of light output from laser source 1 enables display of a full-colored image on light conversion panel 4. Projector lens 5 forms an image of what is displayed on light conversion panel 4, on a screen or a wall outside the image display device. As a result, an image is projected on screen 6. Furthermore, making the image refresh rate 20 kHz or higher enables reproduction of motion video.

As described above, collecting and scanning light on light conversion panel 4 using laser source 1 and deflecting element 3 reduces irradiation of the excitation light outside light conversion panel 4. This enables effective use of light from laser source 1, which is the source of excitation light. For this reason, the above structure increases the light use efficiency as compared with the techniques such as liquid crystal on silicon (LCOS) and a digital mirror device (DMD) in which a light modulation element is entirely irradiated with light emitted from a light source. Therefore, the light use efficiency of the image display device can be increased. To collect light more efficiently, it is preferable that the excitation light from laser source 1 have a single-mode or unimodal beam shape. Furthermore, collecting lens 2 may be a combination of a collimating lens and a collecting lens. It is sufficient as long as light is collected on a unit element of light conversion panel 4.

Figure 5:
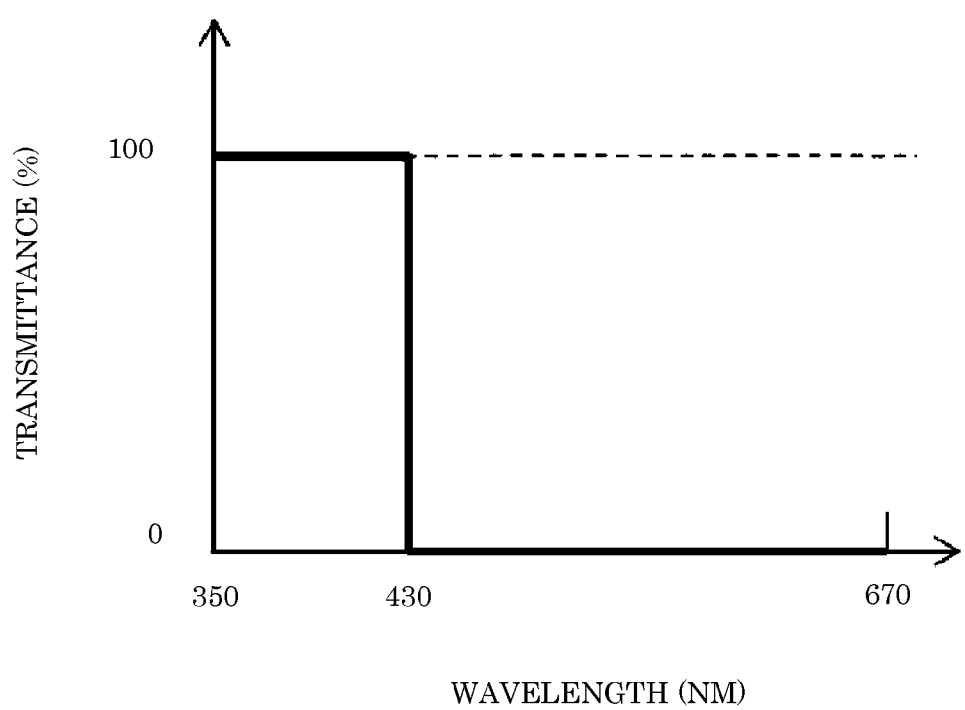
FIG. 5 illustrates characteristics of a wavelength filter of an image display device according to Embodiment 1.

FIG. 3A, FIG. 3B, FIG. 4A, and FIG. 4B illustrate a structure including, instead of transparent substrate 11, wavelength filter 111 between first microlens array 8 and phosphor layers 7. Wavelength filter 111 includes transparent substrate 111a and dielectric multi-layer film 111b which is disposed on transparent substrate 111a, transmits light having a wavelength of excitation light and reflects light having a wavelength of fluorescence emitted from phosphor layers 7. Such a structure allows the fluorescence emitted from phosphor layers 7 to be efficiently directed to second microlens array 9. More specifically, dielectric multi-layer film 111b includes multi layers each having a thickness designed to have such reflection and transmission characteristics that light having a wavelength in a range from 350 nm to 430 nm is transmitted and light having a wavelength in a range from 430 nm to 670 nm is reflected as illustrated in FIG. 5. Dielectric multi-layer film 111b includes a $TiO_2$/$SiO_2$ multi-layer film, for example.

Figure 6:
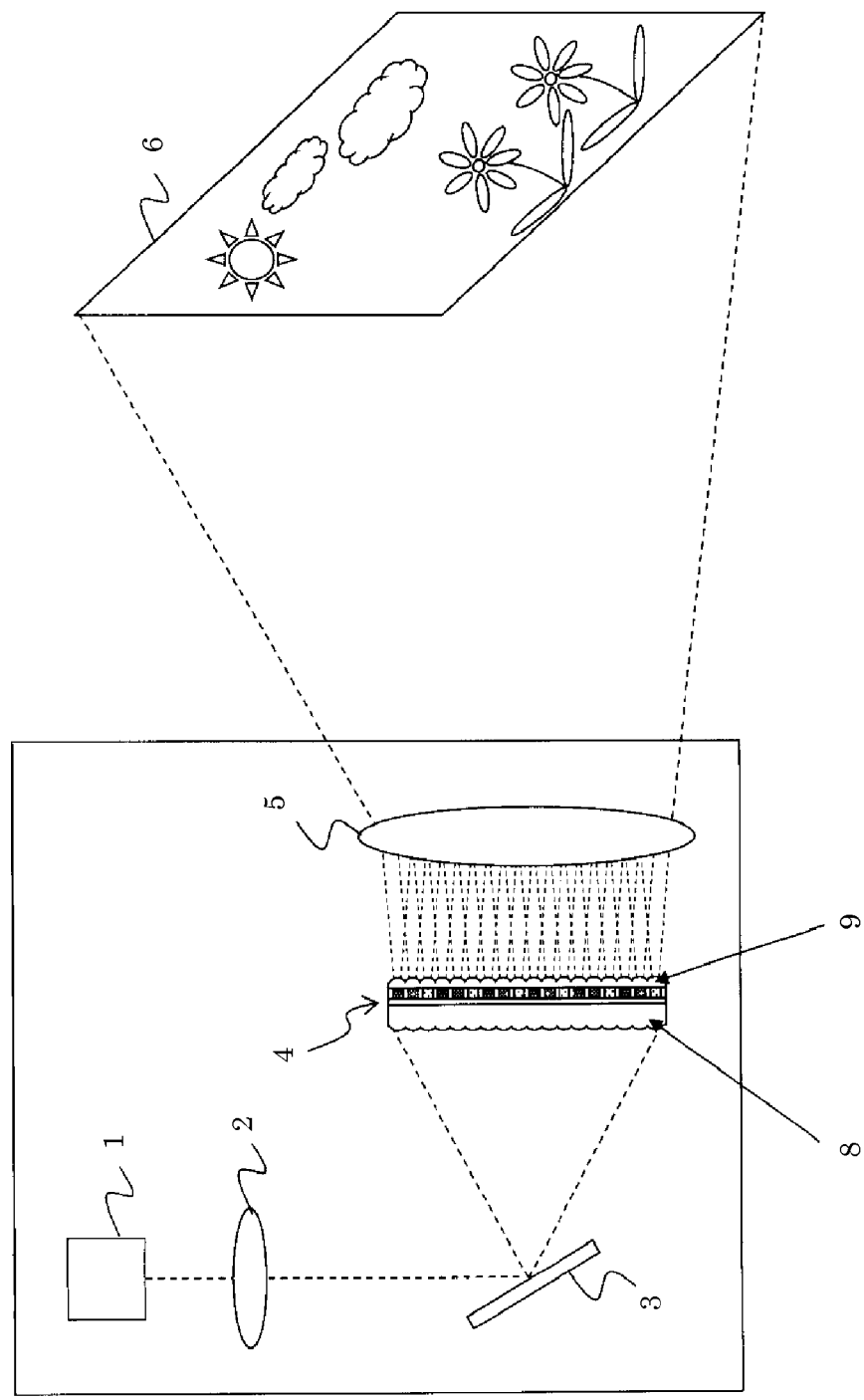
FIG. 6 is a schematic view illustrating a structure of an image display device according to Embodiment 1.
Figure 7:
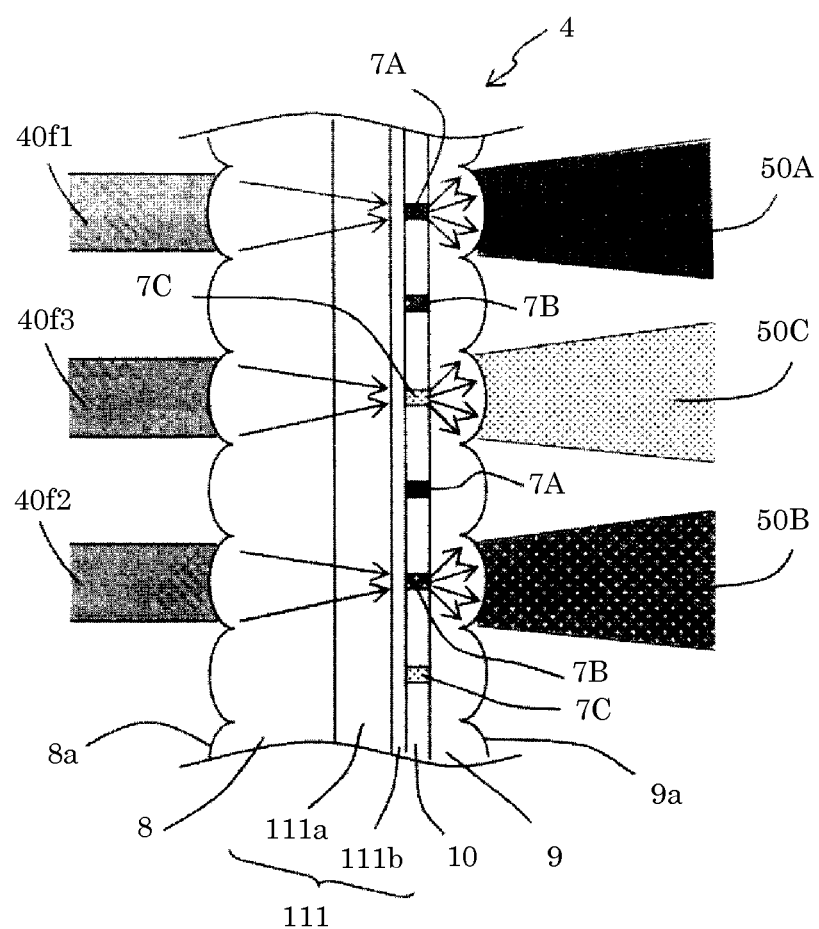
FIG. 7 is a partially enlarged schematic view of a light conversion panel according to Embodiment 1.

In the present embodiment, first microlens array 8 and second microlens array 9 are built into light conversion panel 4 as illustrated in FIG. 6 and FIG. 7. The image display device can thus be miniaturized, making it easier to provide mobile projectors and small projectors.

FIG. 7 is an enlarged view in the vicinity of unit pixel region 12 of light conversion panel 4 illustrated in FIG. 3A, FIG. 3B, FIG. 4A, and FIG. 4B. Incident light 40/1, 40/2, and 40/3, which are lasers entering light conversion panel 4, are collected by microlenses 8a of first microlens array 8, pass through transparent substrate 111a and dielectric multi-layer film 111b of wavelength filter 111, and enter red phosphor layer 7A, green phosphor layer 7B, and blue phosphor layer 7C, respectively. The lasers entering red phosphor layer 7A, green phosphor layer 7B, and blue phosphor layer 7C are converted by red phosphor layer 7A, green phosphor layer 7B, and blue phosphor layer 7C to red light 50A, green light 50B, and blue light 50C, respectively, all of which are fluorescence. Red light 50A, green light 50B, and blue light 50C are transmitted by second microlens array 9, collimated by microlenses 9a, and emitted from light conversion panel 4. Here, wavelength filter 111 is provided on first microlens array 8 side of phosphor layers 7A, 7B, and 7C, thus facilitating guidance of emitted light (fluorescence) to second microlens array 9 side. Accordingly, light conversion panel 4 can efficiently convert incident light to fluorescence.

Figure 8:
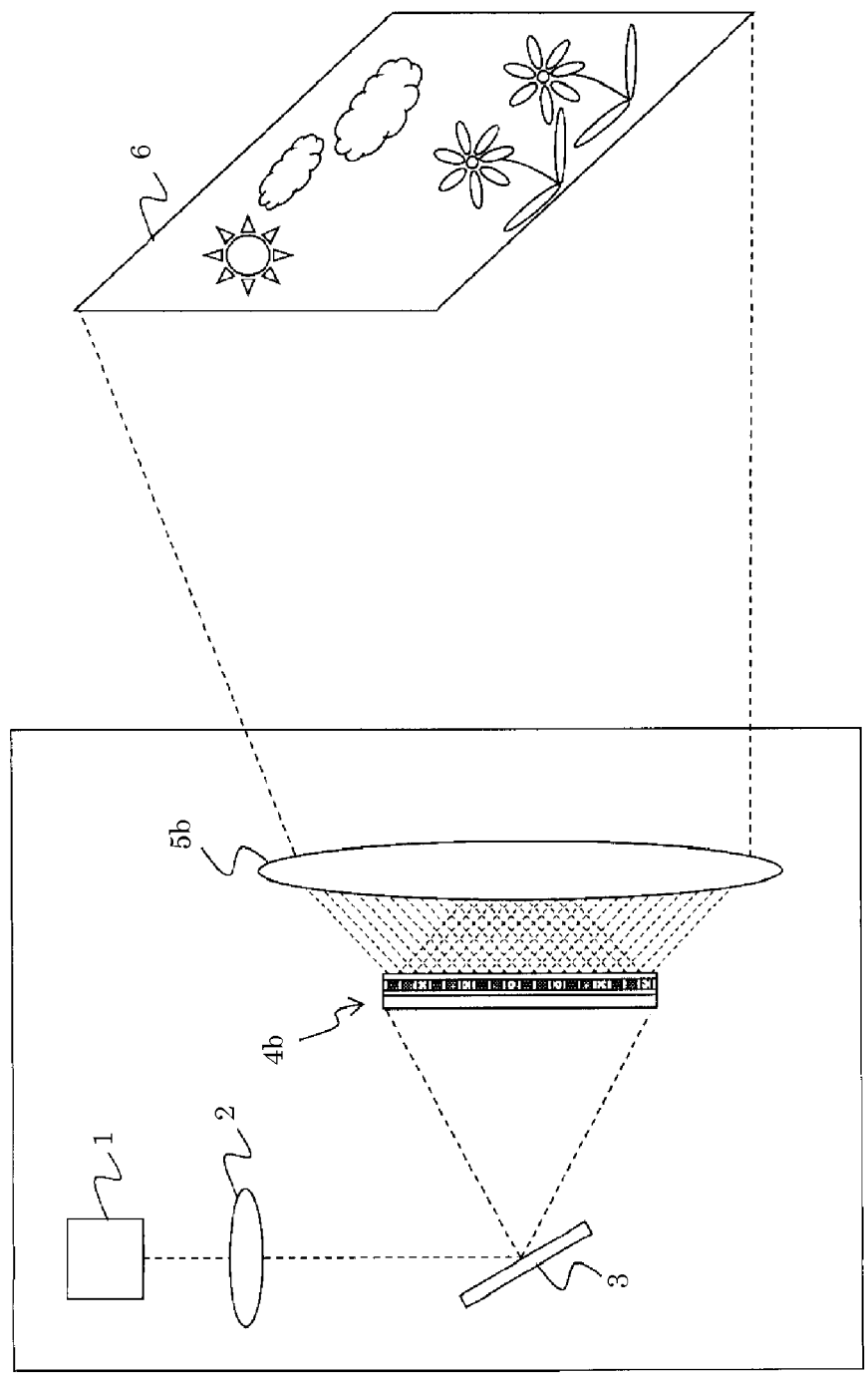
FIG. 8 is a schematic view illustrating another example of an image display device according to Embodiment 1.
Figure 9:
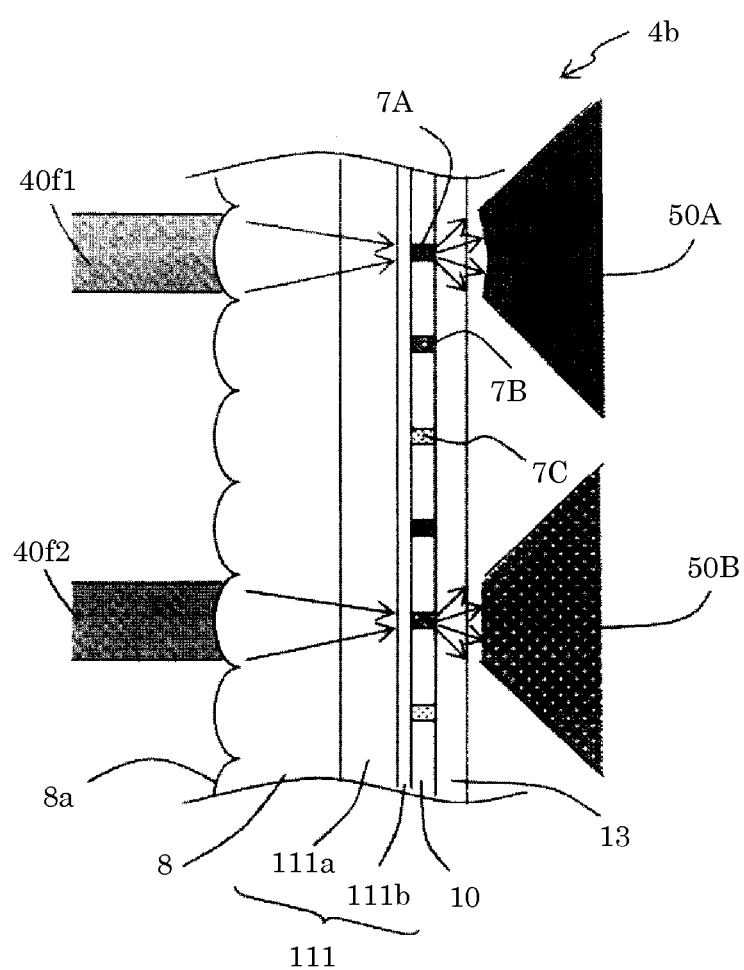
FIG. 9 is a partially enlarged schematic view illustrating another example of a light conversion panel according to Embodiment 1.

On the other hand, when light conversion panel 4b includes none or one of above-described first microlens array 8 and second microlens array 9 as illustrated in FIG. 8 and FIG. 9, red light 50A and green light 50B emitted from light conversion panel 4b have a wide radiation angle like Lambertian distribution. This creates a need to enlarge projector lens 5b according to the radiation angle.

More specifically, FIG. 9 is an enlarged view in the vicinity of a unit pixel region of light conversion panel 4b which does not include a microlens array on the light emission side. Light conversion panel 4b includes, on phosphor layers 7A, 7B, and 7C, transparent member 13 which is flat with no microlens and serves as a protection layer. In this case, red light 50A and green light 50B emitted from light conversion panel 4b have a wide radiation angle like Lambertian distribution. This creates a need to enlarge projector lens 5b according to the radiation angle.

In contrast, having first microlens array 8 and second microlens array 9 built into light conversion panel 4 as illustrated in FIG. 6 and FIG. 7 makes it possible to reduce the radiation angle of red light 50A, green light 50B, and blue light 50C emitted from light conversion panel 4. As a result, it becomes possible to reduce the size of projector lens 5. With this, the image display device can be miniaturized, making it easier to provide mobile projectors and small projectors.

Hereinafter, another example according to the present embodiment will be described with reference to FIG. 10 and FIG. 11.

Figure 10:
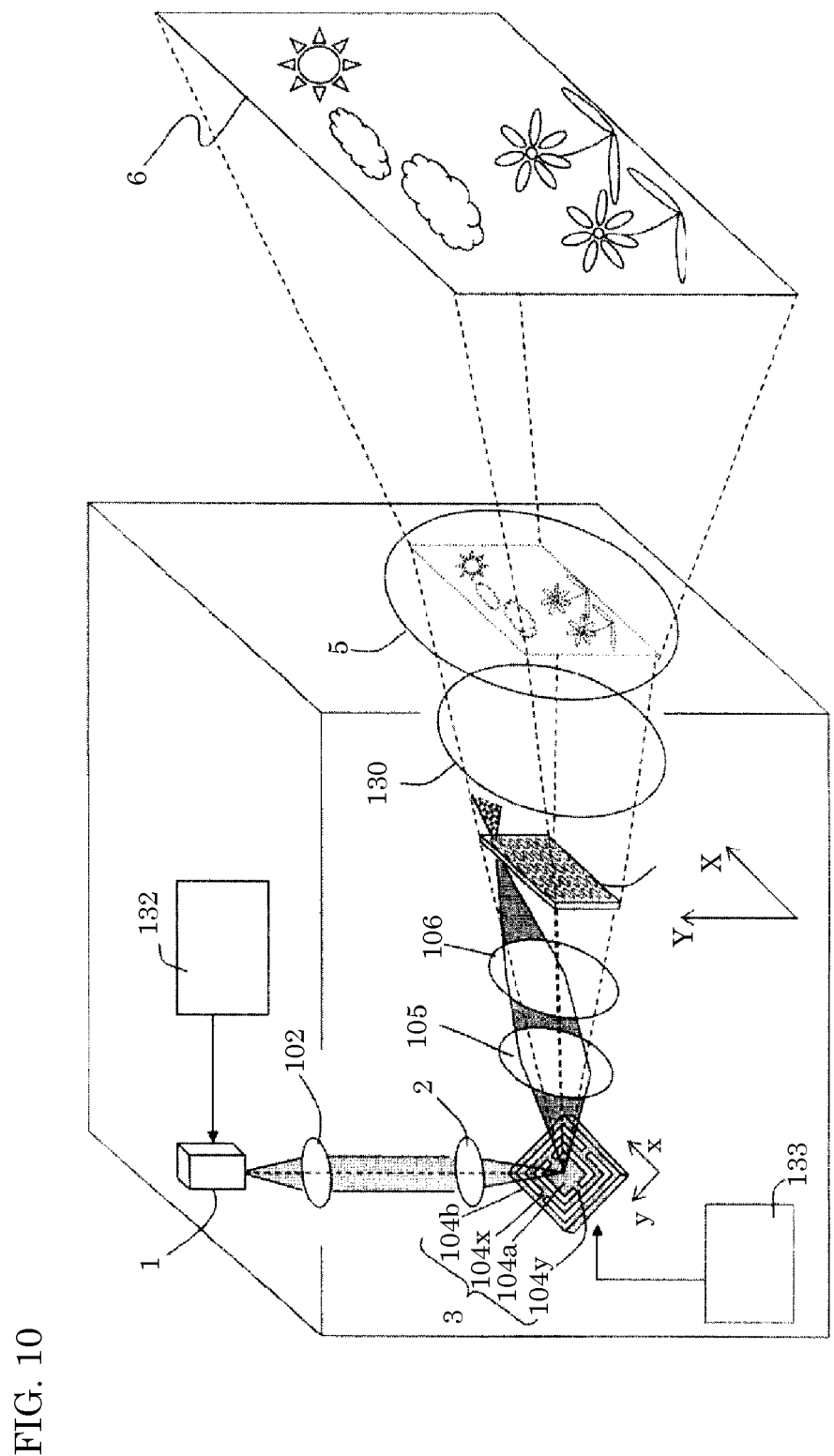
FIG. 10 is a schematic view illustrating another example of an image display device according to Embodiment 1.

As illustrated in FIG. 10, laser source 1 which emits near-ultraviolet light is connected with pulse driving circuit 132, and collecting lens 2 is included which collects the near-ultraviolet light emitted from laser source 1. Disposed between collecting lens 2 and laser source 1 is first collimating lens 102. Disposing first collimating lens 102 increases the efficiency in taking in the excitation light emitted from laser source 1 and makes it easier to design the incident angle of the excitation light incident on deflecting element 3.

Deflecting element 3 which scans the near-ultraviolet light collected by collecting lens 2 includes a micro electro mechanical system (MEMS) mirror. This MEMS mirror includes reflecting mirror 104a and board 104b which is provided on the outer periphery side of reflecting mirror 104a and holds reflecting mirror 104a in such a manner that reflecting mirror 104a is movable. Reflecting mirror 104a is held by board 104b via X-direction scan axis joist 104x and Y-direction scan axis joist 104y, and performs X-direction scan with X-direction scan axis joist 104x as the center and Y-direction scan with Y-direction scan axis joist 104y as the center. These scans are controlled by control circuit 133 which is electrically connected to the MEMS mirror.

The near-ultraviolet light scanned by deflecting element 3 passes through second collimating lens 105 and imaging lens 106 and enters light conversion panel 4. Even when the distance from deflecting element 3 to a unit element of light conversion panel 4 differs depending on the area of light conversion panel 4 (e.g., the center area and an off-center area), disposing second collimating lens 105 and imaging lens 106 allows the excitation light to be collected in the same size toward phosphor layers 7 illustrated in FIG. 11 by using imaging lens 106. That is to say, imaging lens 106 forms an image using the fluorescence emitted from phosphor layers 7.

Figure 11:
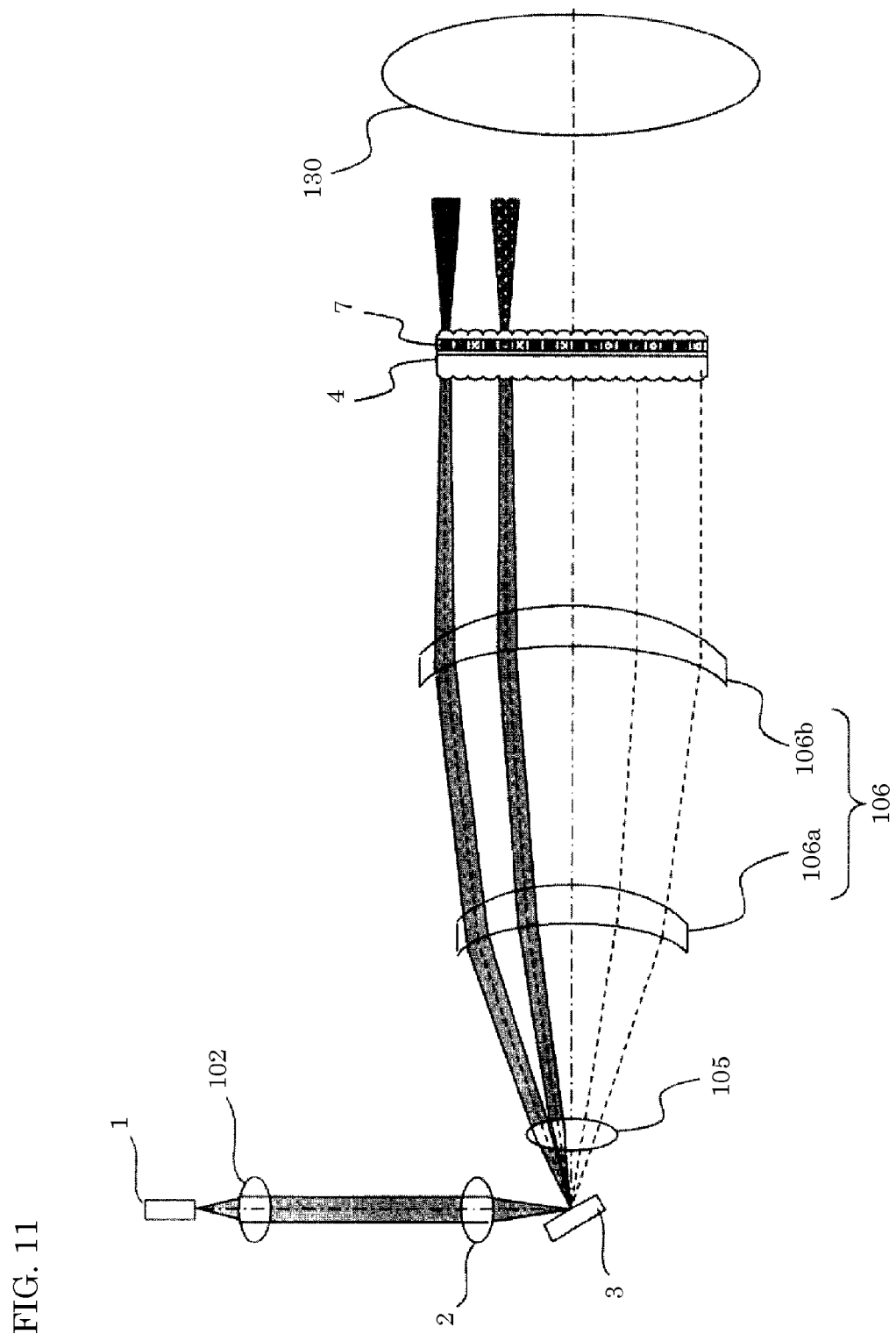
FIG. 11 is a schematic view illustrating another example of an image display device according to Embodiment 1.

As illustrated in FIG. 11, the structure of imaging lens 106 having two lenses, i.e., first imaging lens 106a and second imaging lens 106b, allows the excitation light to be effectively collected in the same size toward phosphor layers 7. It is to be noted that an fθ lens can be used for imaging lens 106.

Light conversion panel 4 converts the wavelength of the incident near-ultraviolet light which has passed through second collimating lens 105 and imaging lens 106, and emits fluorescence.

The fluorescence emitted from light conversion panel 4 passes through capturing lens 130 and enters projector lens 5. Disposing capturing lens 130 allows the fluorescence emitted from light conversion panel 4 to efficiently enter projector lens 5.

The light from projector lens 5 is projected on screen 6 as illustrated in FIG. 10.

Here, light conversion panel 4 includes a plurality of phosphor layers 7 which are planarly disposed, absorb near-ultraviolet light, and emit fluorescence as described earlier with reference to FIG. 2A through FIG. 4B.

Figure 12A:
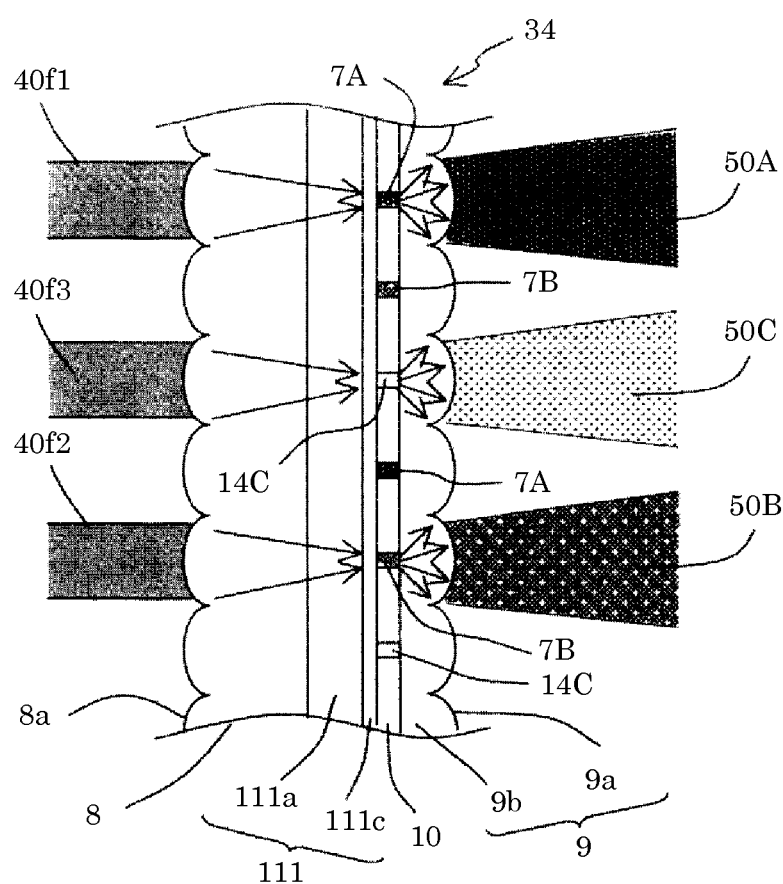
FIG. 12A is a partially enlarged schematic view illustrating another example of a light conversion panel according to Embodiment 1.
Figure 12B:
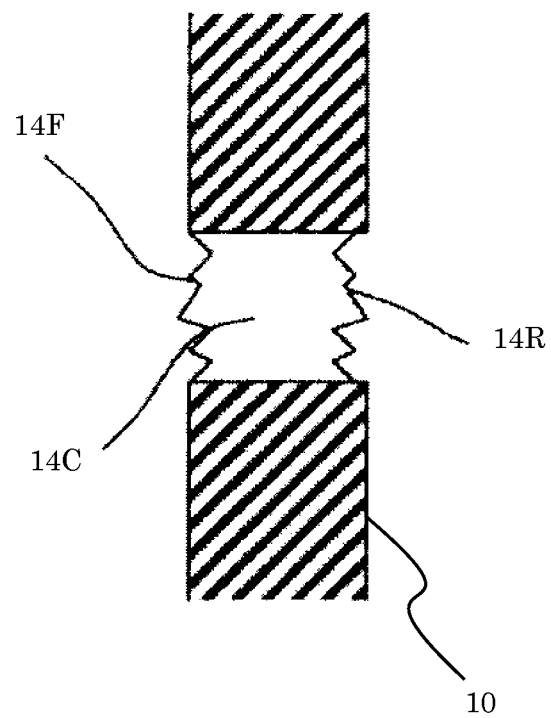
FIG. 12B is a partially enlarged schematic view in the vicinity of a diffusion layer in FIG. 12A.

The present embodiment has described the image display device including: laser source 1 which emits excitation light which is near-ultraviolet light; and light conversion panel 4 which includes phosphor layers 7 each having (i) red phosphor layer 7A which absorbs the near-ultraviolet light and emits red light, (ii) green phosphor layer 7B which absorbs the near-ultraviolet light and emits green light, and (iii) blue phosphor layer 7C which absorbs the near-ultraviolet light and emits blue light. However, the structure is not limited to this. For example, as illustrated in FIG. 12A and FIG. 12B, light conversion panel 34 may include, instead of blue phosphor layers 7C, diffusion layers 14C each including a transparent material such as glass, for example, and having asperities 14F on one surface and asperities 14R on the other surface. In this case, the excitation light can be diffused when emitted from light conversion panel 34, and thus it is possible to reduce speckles and reduce efficiency degradation caused by conversion loss at blue phosphor layers 7C.

With the above structure, the center wavelength of the excitation light may be in a range from 430 nm to 500 nm, for example. Furthermore, instead of dielectric multi-layer film 111b illustrated in FIG. 7, dielectric multi-layer film 111c may be used which transmits light having a wavelength in a range from 350 nm to 500 nm and reflects light having a wavelength in a range from 500 nm to 670 nm as illustrated in FIG. 12A and FIG. 12B. This structure allows efficient emission of blue light from light conversion panel 34 as well as reduction of speckles.

Embodiment 2

Hereinafter, an image display device according to Embodiment 2 will be described with reference to the drawings.

Figure 13:
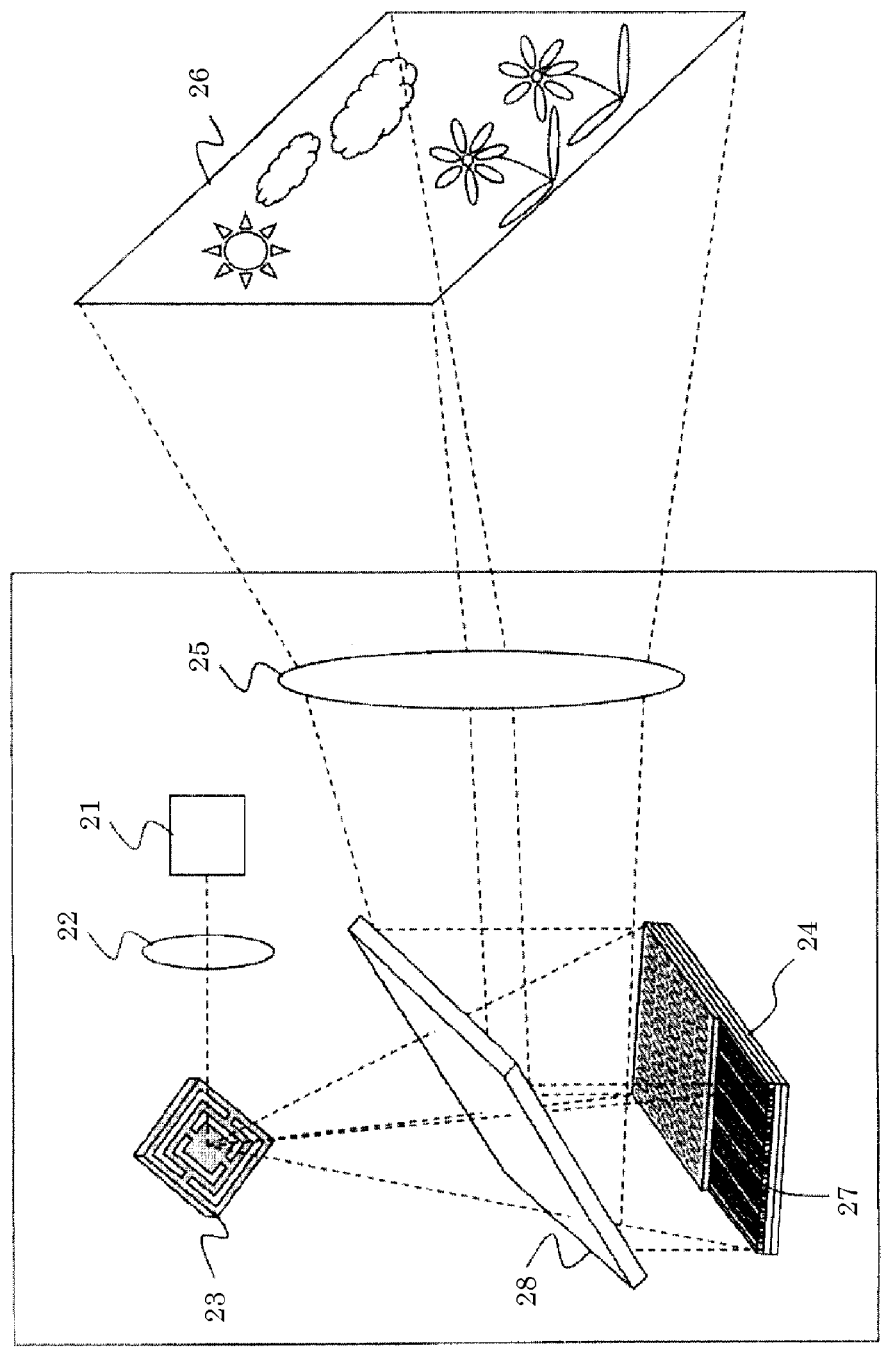
FIG. 13 is a schematic view illustrating a structure of an image display device according to Embodiment 2.
Figure 14:
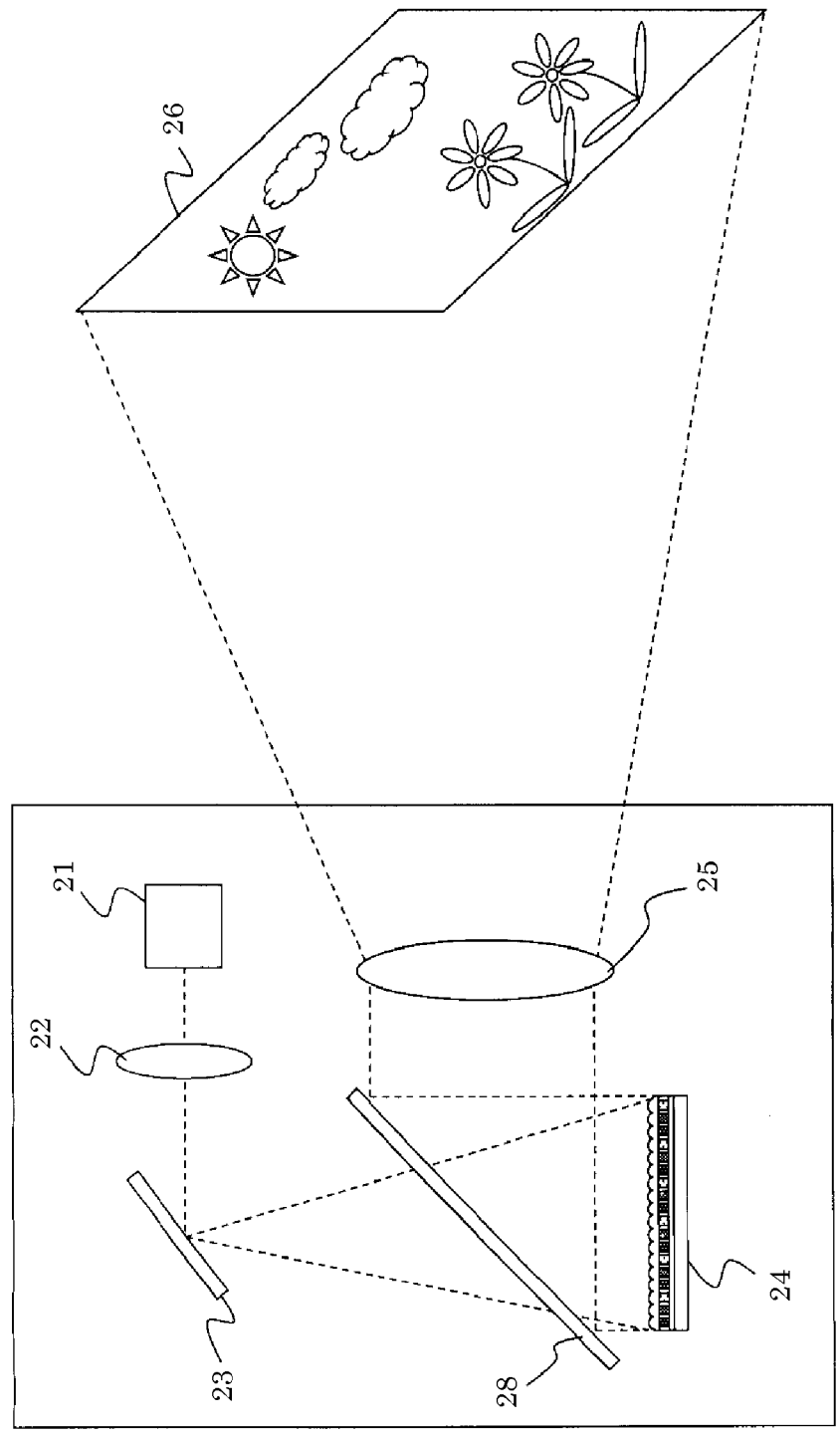
FIG. 14 is a schematic view illustrating a structure of an image display device according to Embodiment 2.

As illustrated in FIG. 13 and FIG. 14, the image display device according to Embodiment 2 includes: laser source 21 which emits excitation light which is near-ultraviolet light; collecting lens 22 which collects the excitation light; deflecting element 23 that is a movable reflecting mirror which scans the excitation light collected by collecting lens 22; light conversion panel 24 which absorbs a part of all of the excitation light scanned by deflecting element 23, converts the wavelength of the absorbed excitation light, and emits the resultant as fluorescence; and projector lens 25 which projects light emitted from light conversion panel 24.

The light from projector lens 25 is projected on screen 26.

Here, light conversion panel 24 includes a plurality of phosphor layers 27 which are planarly disposed, absorb near-ultraviolet light, and emit fluorescence.

In the present embodiment, dichroic mirror 28 is further included which transmits excitation light and reflects fluorescence.

The excitation light scanned by deflecting element 23 passes through dichroic mirror 28 and enters light conversion panel 24.

Figure 15A:
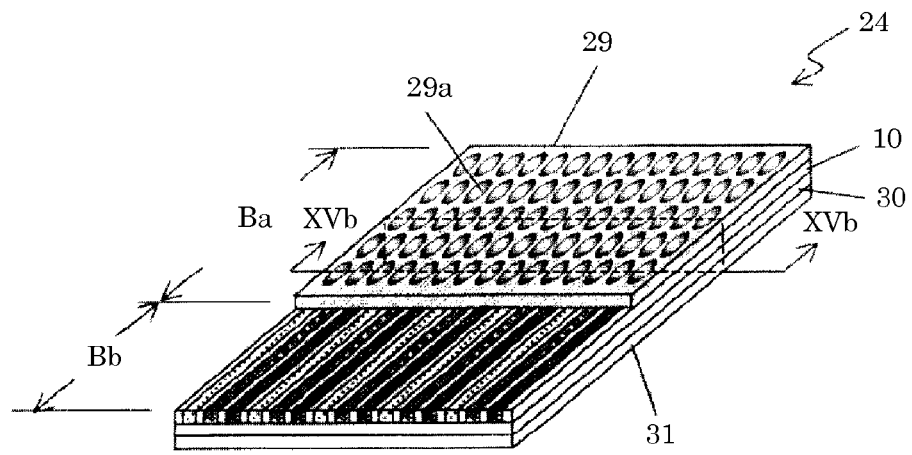
FIG. 15A is a partially cutaway perspective view of a light conversion panel according to Embodiment 2.
Figure 15B:
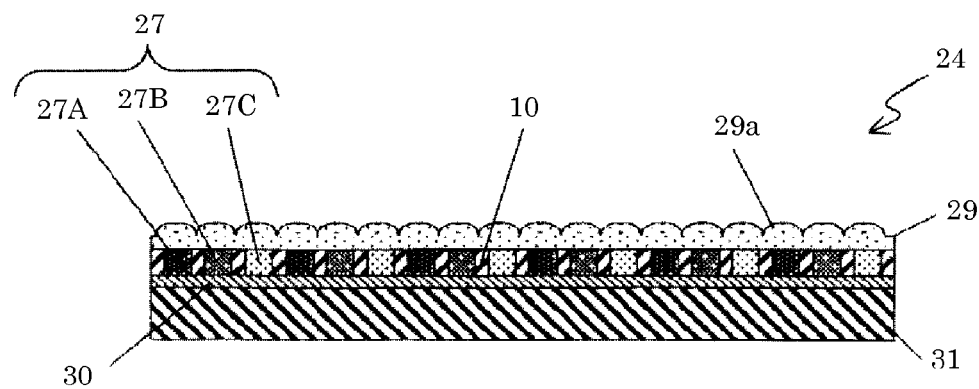
FIG. 15B is a cross-sectional view along line XVb-XVb in FIG. 15A.

As illustrated in FIG. 15A and FIG. 15B, light conversion panel 24 includes: microlens array 29 which collects the excitation light that has passed through dichroic mirror 28 and guides the collected light to phosphor layers 27; and reflecting layer 30 which reflects the fluorescence emitted from phosphor layers 27. That is to say, phosphor layers 27 are disposed between a first microlens array (microlens array 29) and reflecting layer 30 according to the present embodiment.

Region Ba in FIG. 15A illustrates the surface of light conversion panel 24 with microlens array 29 disposed. Region Bb in FIG. 15A illustrates light conversion panel 24 with microlens array 29 removed for the purpose of illustration of the present embodiment. FIG. 15B is a schematic cross-sectional view along line XVb-XVb in FIG. 15A.

Figure 16:
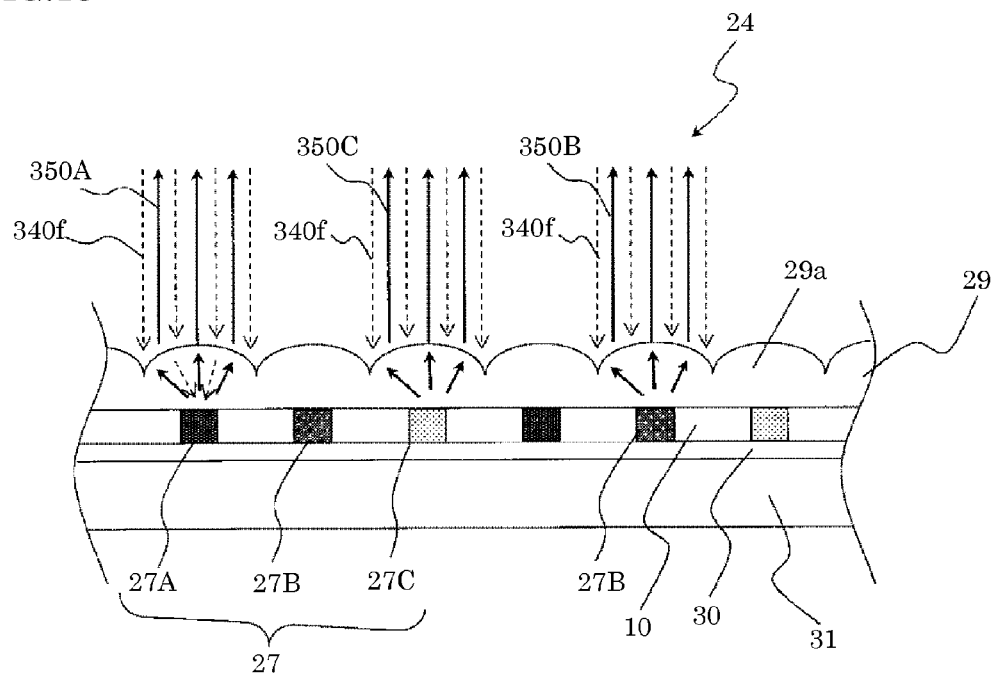
FIG. 16 is a partially enlarged schematic view of a light conversion panel according to Embodiment 2.

FIG. 16 is an enlarged view in the vicinity of a unit pixel region of light conversion panel 24 illustrated in FIG. 15B. Incident light 340f which are lasers entering light conversion panel 24 are collected by microlenses 29a of microlens array 29, pass through microlens array 29, and enter red phosphor layers 27A, green phosphor layers 27B, and blue phosphor layers 27C. The lasers entering red phosphor layers 27A, green phosphor layers 27B, and blue phosphor layers 27C are converted by red phosphor layers 27A, green phosphor layers 27B, and blue phosphor layers 27C to red light 350A, green light 350B, and blue light 350C, respectively, all of which are fluorescence. Red light 350A, green light 350B, and blue light 350C are transmitted by second microlens array 29, collimated by microlenses 29a, and emitted from light conversion panel 24.

As illustrated in FIG. 16, the excitation light entering red phosphor layers 27A, green phosphor layers 27B, and blue phosphor layers 27C are absorbed by red phosphor layers 27A, green phosphor layers 27B, and blue phosphor layers 27C and emitted in all directions as red light 350A, green light 350B, and blue light 350C all of which are fluorescence. The fluorescence travelling toward reflecting layer 30 is reflected off reflecting layer 30 in the direction of microlens array 29. The fluorescence emitted from light conversion panel 24 is collimated and transmitted by microlens array 29, reflected off dichroic mirror 28, and enters projector lens 25.

Such a structure allows the light from laser source 21 to be converted to fluorescence by light conversion panel 24 before being emitted, and thus light has a wider range of wavelengths and phases. This reduces mutual interference of light reflected off screen 26, thus reducing speckles.

In the present embodiment, the fluorescence emitted from phosphor layer 27 passes through microlens array 29. This allows the fluorescence having directivity to be emitted from light conversion panel 24, enabling efficient emission of fluorescence from the image display device.

As illustrated in FIG. 15A, FIG. 15B, and FIG. 16, disposed between phosphor layers 27 (e.g., between red phosphor layer 27A and green phosphor layer 27B) is spacer 10 which includes a high thermal conducting material having a thermal conductivity higher than that of phosphor layers 27.

Disposing such spacer 10 enables efficient dissipation, to the outside of phosphor layers 27, of heat generated when phosphor layers 27 absorb the near-ultraviolet light emitted from laser source 1 and emit fluorescence.

For the high thermal conducting material, at least one of copper, aluminum alloy, magnesium alloy, silicon carbide, zinc oxide, aluminum nitride, and diamond can be used.

For spacer 10, it is also beneficial to use a highly reflective material having a high reflectance in the range of wavelengths of fluorescence spectrum generated by phosphors (i.e., a material having a reflectance higher than that of phosphor layers 27).

Disposing such spacer 10 reduces absorption of fluorescence generated by phosphor layers 27 and allows the fluorescence to be efficiently guided to microlens array 29.

Silver, aluminum, or an alloy of these, for example, can be used for the highly reflective material.

It is preferable that spacer 10 be manufactured by forming, on the surface of the high thermal conducting material having a thermal conductivity higher than that of phosphor layers 27, a film including a highly reflective material having a high reflectance in the range of wavelengths of fluorescence spectrum generated by phosphors. This way, the above-described two advantageous effects can be achieved.

In the present embodiment, light conversion panel 24 includes reflecting layer 30, and thus the light enters and exits from the same surface of phosphor layers 27. This makes it possible to dispose heat dissipating member 31, such as a heat dissipating block or a radiator fin, on the surface of reflecting layer 30 opposite the surface contacting phosphor layers 27. Disposing such heat dissipating member 31 increases the conversion efficiency of phosphor layers 27. More specifically, conversion loss and stokes loss (wavelength shift loss) are the causes of heat when phosphor layers 27 perform wavelength conversion. If the temperature of phosphor layers 27 rises due to the heat, the conversion efficiency decreases. To address this, above-described heat dissipating member 31 is disposed according to the present embodiment, and thus the decrease in the conversion efficiency can be lessened. Furthermore, since a heat dissipating member can be disposed on one surface of reflecting layer 30, there is a greater design flexibility and the decrease in the conversion efficiency can be further lessened.

Figure 17:
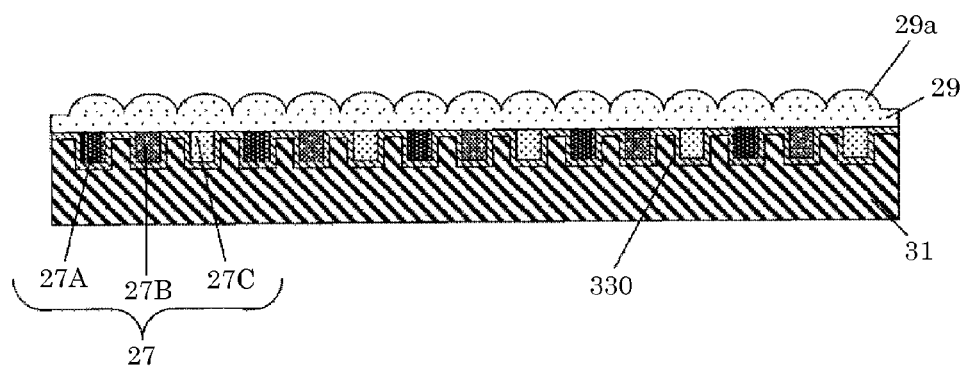
FIG. 17 is a cross-sectional view illustrating another example of an image display device according to Embodiment 2.

As illustrated in FIG. 17, reflecting layer 330 formed by, for example, providing asperities on a metal film may be disposed on heat dissipating member 31, and phosphor layers 27 (red phosphor layers 27A, green phosphor layers 27B, and blue phosphor layers 27C) may be disposed in the dips of reflecting layer 330. Such a structure reduces the manufacturing cost because only a single sheet of metal film is necessary for transmitting the heat from phosphor layers 27 to heat dissipating member 31 and for providing the bottom and side surfaces of the dips with high reflectance. Moreover, since only the thin metal film is present between heat dissipating member 31 and phosphor layers 27, the radiation efficiency can be increased.

Figure 18A:
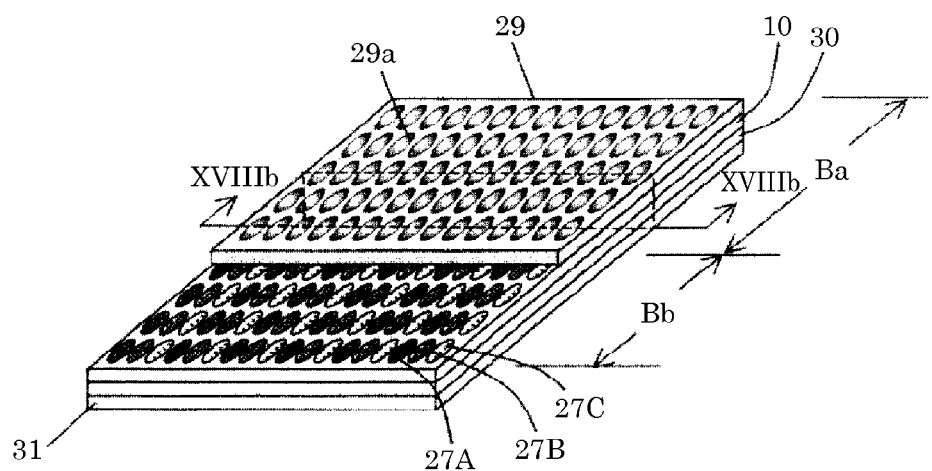
FIG. 18A is a partially cutaway perspective view illustrating another example of a light conversion panel according to Embodiment 2.
Figure 18B:
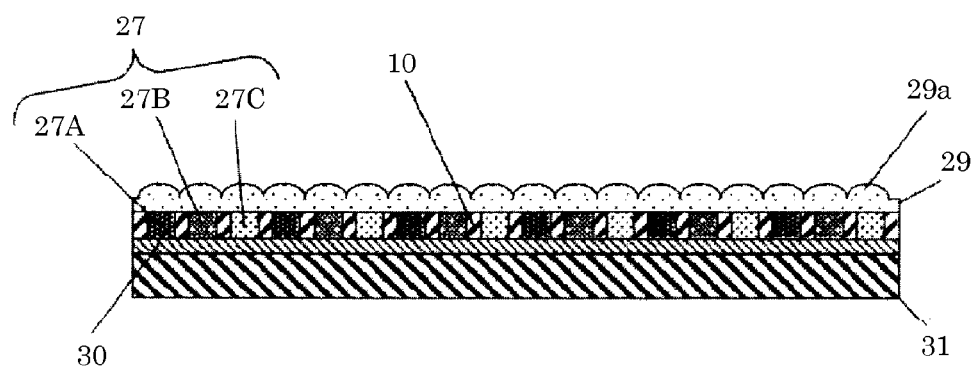
FIG. 18B is a cross-sectional view along line XVIIIb-XVIIIb in FIG. 18A.

In the present embodiment, red phosphor layers 27A, green phosphor layers 27B, and blue phosphor layers 27C are disposed in parallel straight lines in the horizontal direction. However, they may be disposed in straight lines in the vertical direction. They may also be formed in elliptical or circular shapes in positions corresponding to microlenses 29a of microlens array 29 as illustrated in FIG. 18A. It is preferable in terms of efficiency that the shape of microlenses 29a be elliptical to match with the shape of the beam emitted from laser source 1.

Figure 19:
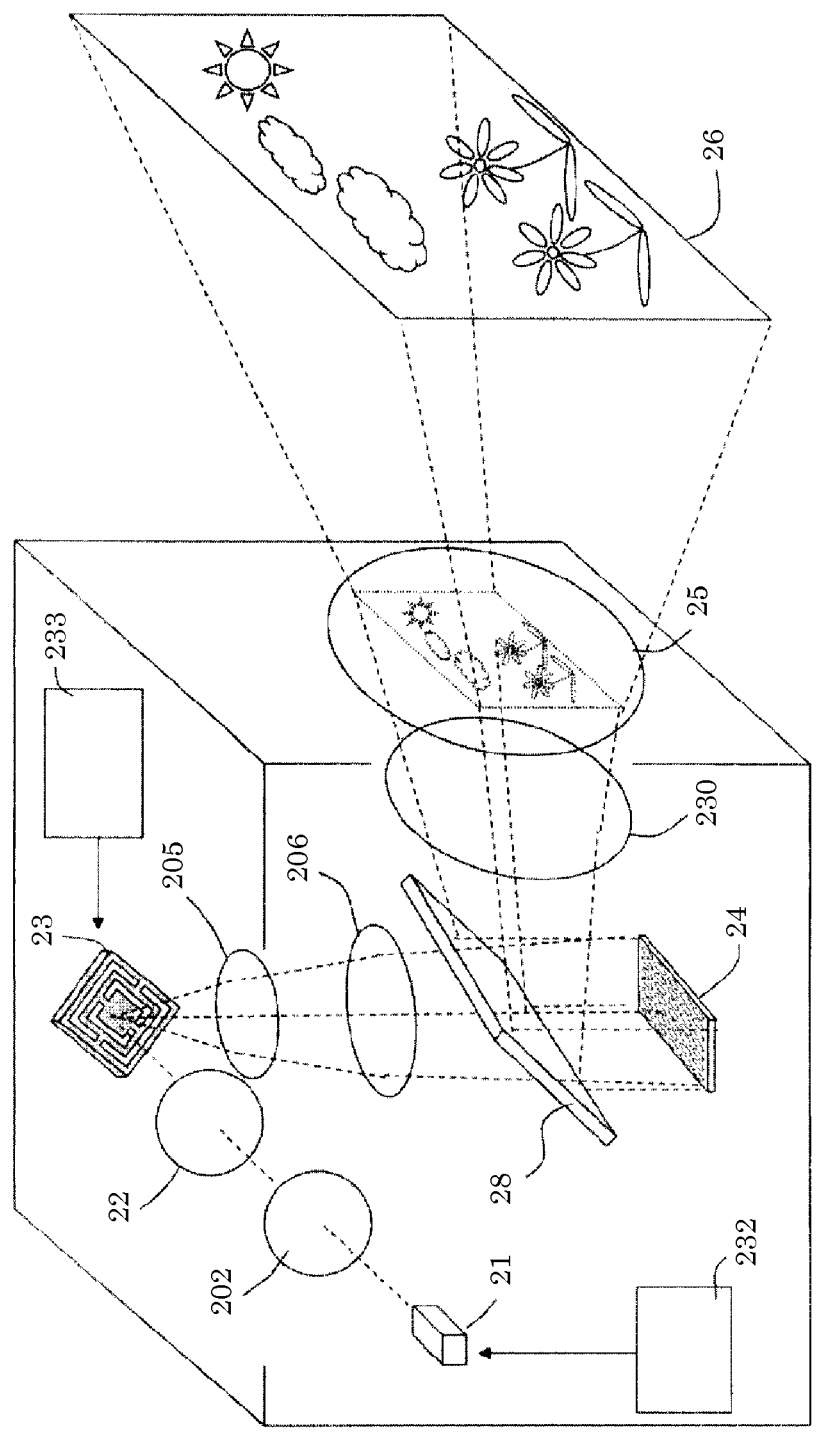
FIG. 19 is a schematic view illustrating another example of an image display device according to Embodiment 2.

Hereinafter, another example according to the present embodiment will be described with reference to FIG. 19 and FIG. 20.

Laser source 21 which emits excitation light is connected with pulse driving circuit 232. First collimating lens 202 is disposed between laser source 21 and collecting lens 22 which collects the near-ultraviolet light emitted from laser source 21. Disposing first collimating lens 202 increases the efficiency in taking in the excitation light emitted from laser source 21 and makes it easier to design the incident angle of the excitation light incident on deflecting element 23.

Deflecting element 23 which scans the near-ultraviolet light collected by collecting lens 22 includes the MEMS mirror and control circuit 233 described in Embodiment 1.

The near-ultraviolet light scanned by deflecting element 23 passes through second collimating lens 205 and imaging lens 206 and enters light conversion panel 24. Even when the distance from deflecting element 23 to a unit element of light conversion panel 24 differs depending on the area of light conversion panel 24 (e.g., the center area and an off-center area), disposing second collimating lens 205 and imaging lens 206 allows the excitation light to be collected in the same size toward phosphor layers 27.

Figure 20:
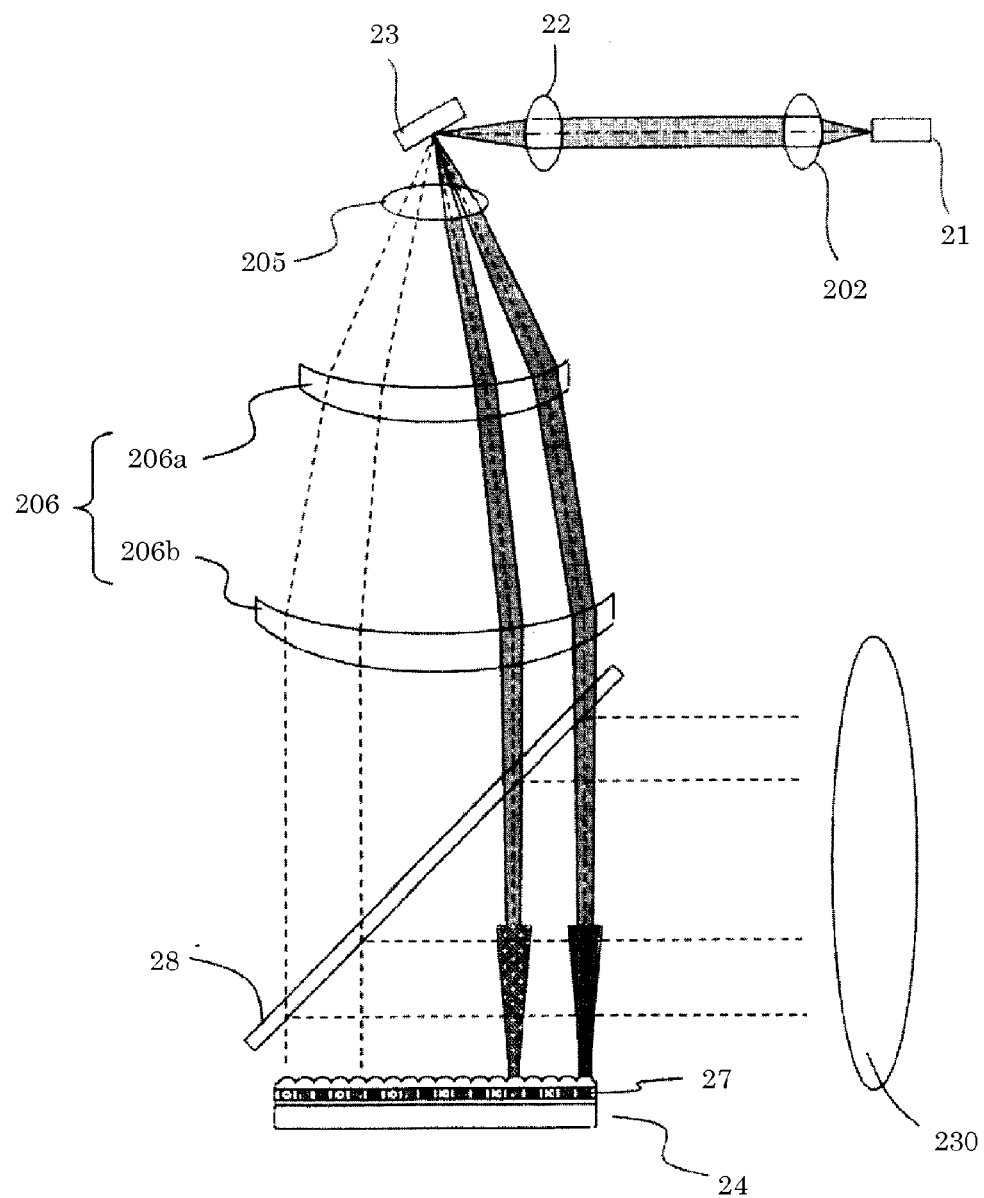
FIG. 20 is a schematic view illustrating another example of an image display device according to Embodiment 2.

As illustrated in FIG. 20, the structure of imaging lens 206 having two lenses, i.e., first imaging lens 206a and second imaging lens 206b, allows the excitation light to be effectively collected in the same size toward the phosphor layers. It is to be noted that an fθ lens can be used for the imaging lens.

In the present embodiment, dichroic mirror 28 is further included which transmits near-ultraviolet light and reflects fluorescence. Dichroic mirror 28 has such reflection and transmission characteristics that light having a wavelength in a range from 350 nm to 430 nm is transmitted and light having a wavelength in a range from 430 nm to 670 nm is reflected as illustrated in FIG. 5. Thus, the near-ultraviolet light scanned by deflecting element 23 passes through dichroic mirror 28 and enters light conversion panel 24.

As illustrated in FIG. 15A, FIG. 15B, FIG. 18A, and FIG. 18B, light conversion panel 24 includes: microlens array 29 which collects the near-ultraviolet light that has passed through dichroic mirror 28 and guides the collected light to phosphor layers 27; and reflecting layer 30 which reflects the fluorescence emitted from phosphor layers 27. The fluorescence reflected off reflecting layer 30 passes through phosphor layers 27 and microlens array 29, and the fluorescence which has passed through microlens array 29 is reflected off dichroic mirror 28 as illustrated in FIG. 19 and FIG. 20. The reflected light passes through capturing lens 230 and enters projector lens 25. Disposing capturing lens 230 allows the fluorescence emitted from light conversion panel 24 to efficiently enter projector lens 25.

The light from projector lens 25 is then projected on screen 26.

Figure 21:
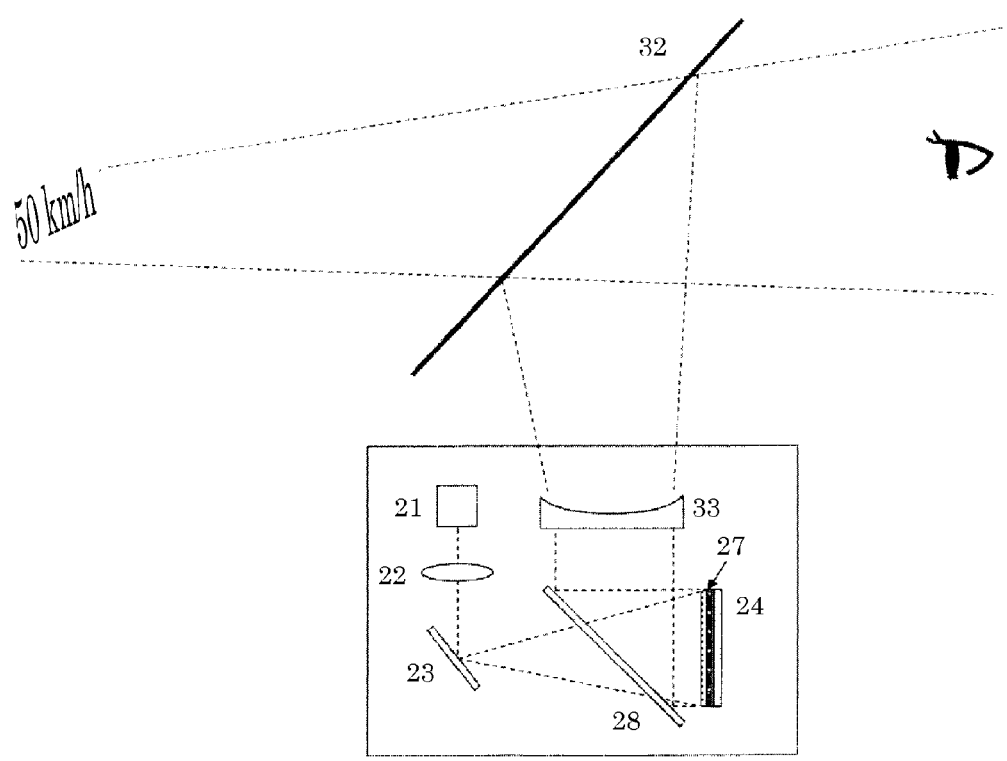
FIG. 21 is a schematic view illustrating another example of an image display device according to Embodiment 2.
Figure 22:
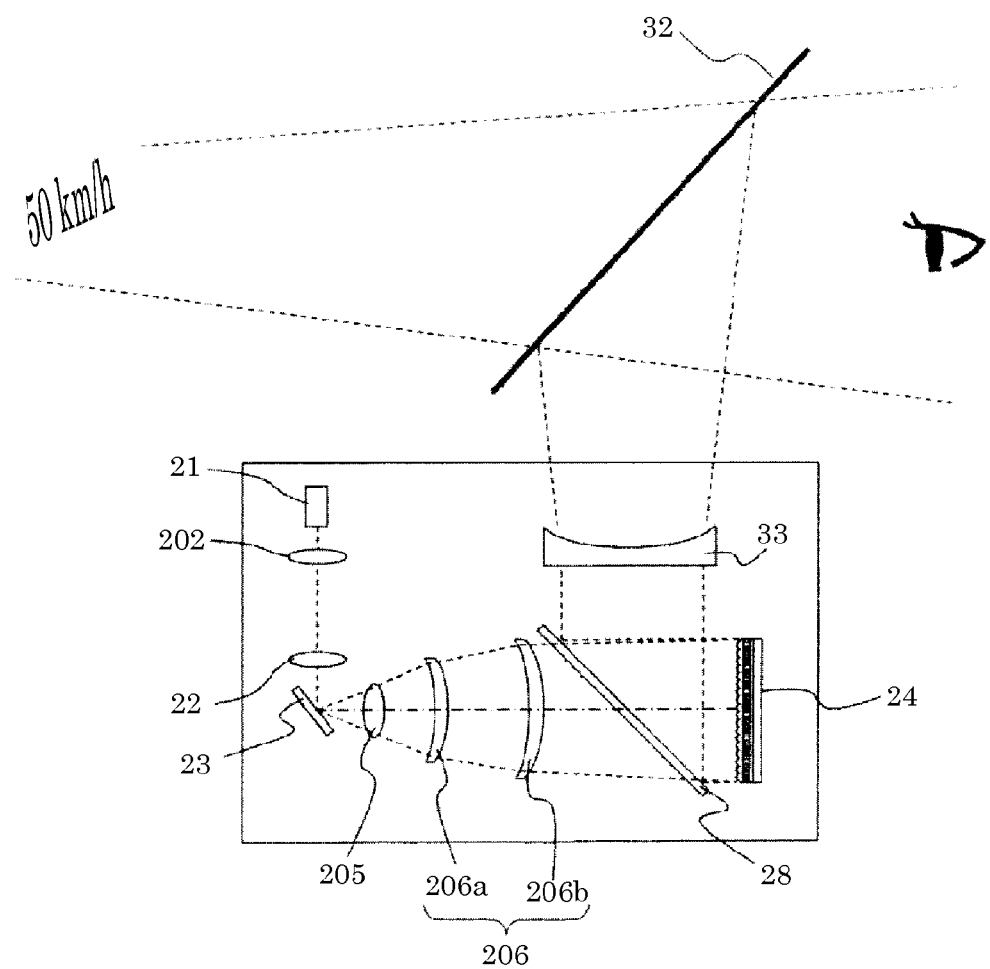
FIG. 22 is a schematic view illustrating another example of an image display device according to Embodiment 2.

Instead of projecting the light from projector lens 25 on screen 26, the light may be projected on combiner 32 to form a virtual image as illustrated in FIG. 21 and FIG. 22. This is an image display device generally known as a head-up display. More specifically, this image display device projects the fluorescence emitted from phosphor layers 27 included in light conversion panel 24 on combiner 32 using imaging lens 33, so that a virtual image is formed. Such a structure simplifies the installation and use in airplanes and vehicles, for example.

Furthermore, as illustrated in FIG. 22, disposing first collimating lens 202 between laser source 21 and collecting lens 22 increases the efficiency in taking in the excitation light emitted from laser source 21 and makes it easier to design the incident angle of the excitation light incident on deflecting element 23.

As illustrated in FIG. 22, the near-ultraviolet light scanned by deflecting element 23 passes through second collimating lens 205 and imaging lens 206 and enters light conversion panel 24. With such a structure, even when the distance from deflecting element 23 to a unit element of light conversion panel 24 differs depending on the area of light conversion panel 24 (e.g., the center area and an off-center area), the excitation light can be collected in the same size toward phosphor layers 27.

Moreover, the structure of imaging lens 206 having two lenses, i.e., first imaging lens 206a and second imaging lens 206b, allows the excitation light to be effectively collected in the same size toward phosphor layers 27. It is to be noted that an fθ lens can be used for the imaging lens.

Figure 23:
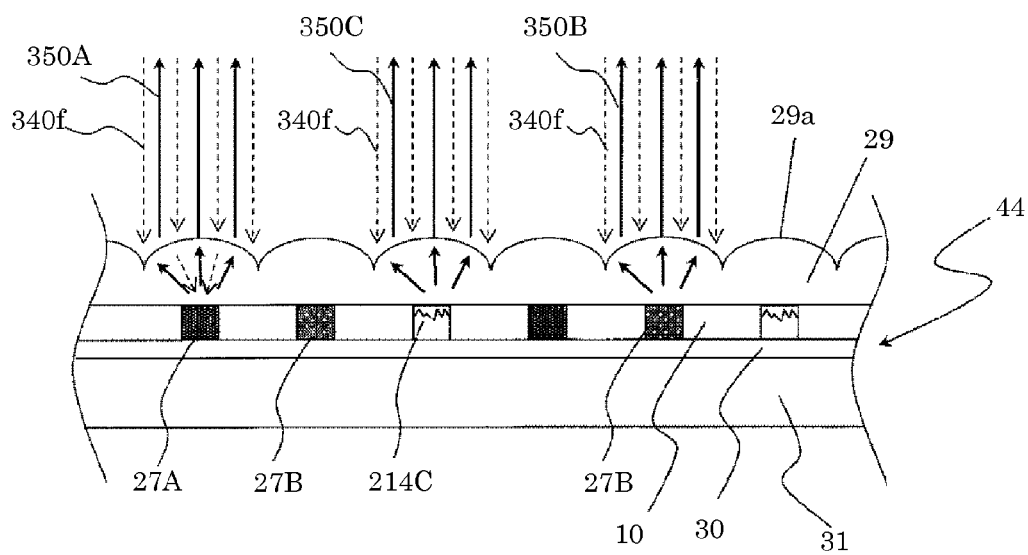
FIG. 23 is a partially enlarged schematic view of a light conversion panel according to Embodiment 2.

The present embodiment has described the image display device including: laser source 21 which emits excitation light which is near-ultraviolet light; and light conversion panel 24 which includes phosphor layers 27 each having (i) red phosphor layer 27A which absorbs the near-ultraviolet light and emits red light, (ii) green phosphor layer 27B which absorbs the near-ultraviolet light and emits green light, and (iii) blue phosphor layer 27C which absorbs the near-ultraviolet light and emits blue light. However, the structure is not limited to this. For example, as illustrated in FIG. 23, light conversion panel 44 may include, instead of blue phosphor layers 27C, diffusion layers 214C each including a transparent material such as glass, for example, and having asperities on a surface. In this case, the excitation light can be diffused when emitted from light conversion panel 44, and thus it is possible to reduce speckles and reduce efficiency degradation caused by conversion loss at blue phosphor layers 27C.

With the above structure, incident light 340f emitted from laser source 21 are collected by microlenses 29a of microlens array 29 toward red phosphor layers 27A, green phosphor layers 27B, and diffusion layers 214C. Although red light 350A emitted from red phosphor layers 27A, green light 350B emitted from green phosphor layers 27B, and blue light 350C emitted from diffusion layers 214C are diffused light, they are collimated by microlenses 29a, and thus are efficiently emitted from the image display device.

With the above structure, the center wavelength of the excitation light may be in a range from 430 nm to 500 nm, for example. For the dichroic mirror, a material may be used which transmits light having a wavelength in a range from 350 nm to 500 nm and reflects light having a wavelength in a range from 500 nm to 670 nm. This structure allows efficient emission of blue light from light conversion panel 44 as well as reduction of speckles.

Embodiment 3

Hereinafter, an image display device according to Embodiment 3 will be described with reference to the drawings.

Figure 24:
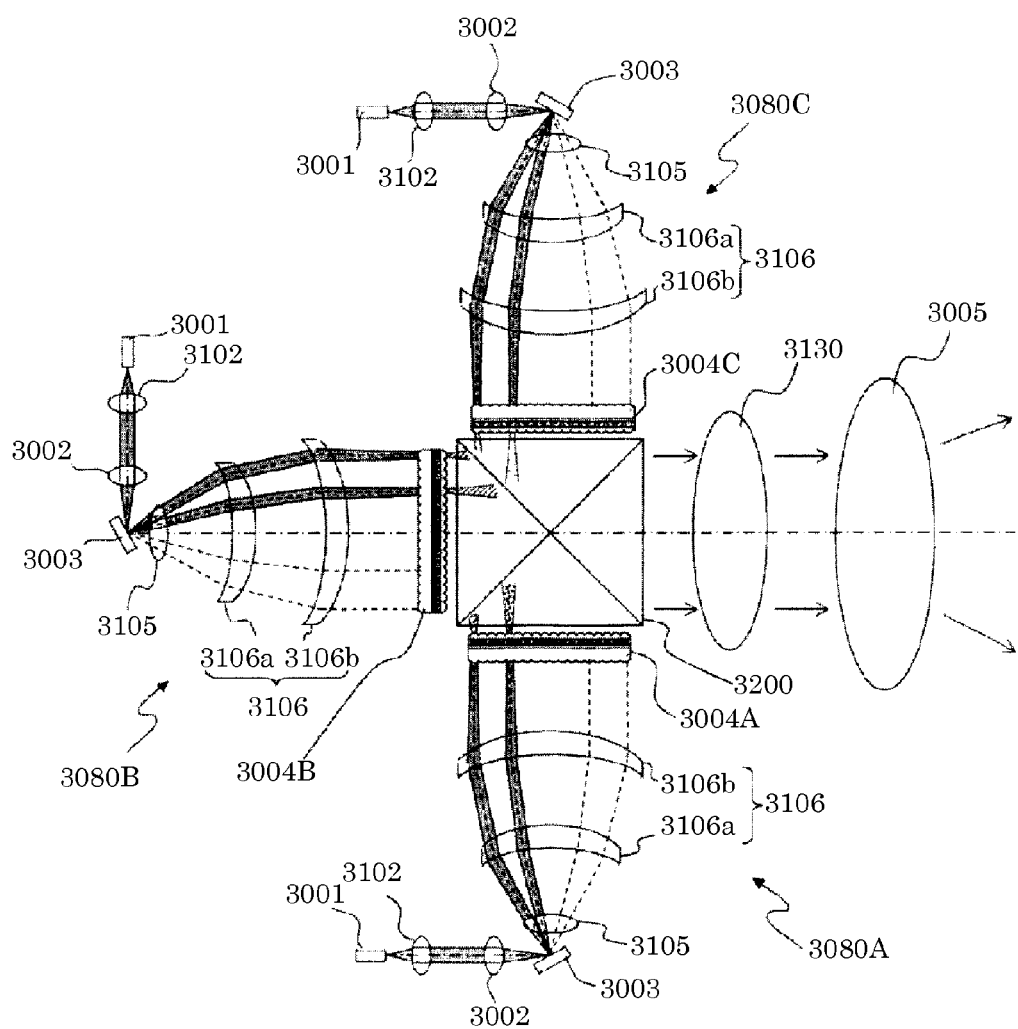
FIG. 24 is a schematic view illustrating a structure of an image display device according to Embodiment 3.

As illustrated in FIG. 24, the image display device according to Embodiment 3 includes first two-dimensional image generation unit 3080A, second two-dimensional image generation unit 3080B, and third two-dimensional image generation unit 3080C for red, green, and blue, respectively. Each of first two-dimensional image generation unit 3080A, second two-dimensional image generation unit 3080B, and third two-dimensional image generation unit 3080C includes laser source 3001 which emits excitation light which is near-ultraviolet light; collecting lens 3002 which collects the excitation light; deflecting element 3003 which is a movable reflecting mirror that scans the excitation light collected by collecting lens 3002; a light conversion panel which absorbs a part of all of the excitation light scanned by deflecting element 3003, converts the wavelength of the absorbed excitation light, and emits the resultant as fluorescence. The image display device also includes multiplexing prism 3200 which multiplexes red, green, and blue fluorescence and projector lens 3005 which projects the emitted light.

Each of first two-dimensional image generation unit 3080A, second two-dimensional image generation unit 3080B, and third two-dimensional image generation unit 3080C includes laser source 3001, collecting lens 3002, and deflecting element 3003. In addition, first two-dimensional image generation unit 3080A that is for red image display includes light conversion panel 3004A having red phosphors, second two-dimensional image generation unit 3080B that is for green image display includes light conversion panel 3004B having green phosphors, and third two-dimensional image generation unit 3080C that is for blue image display includes light conversion panel 3004C having blue phosphors.

Figure 25A:
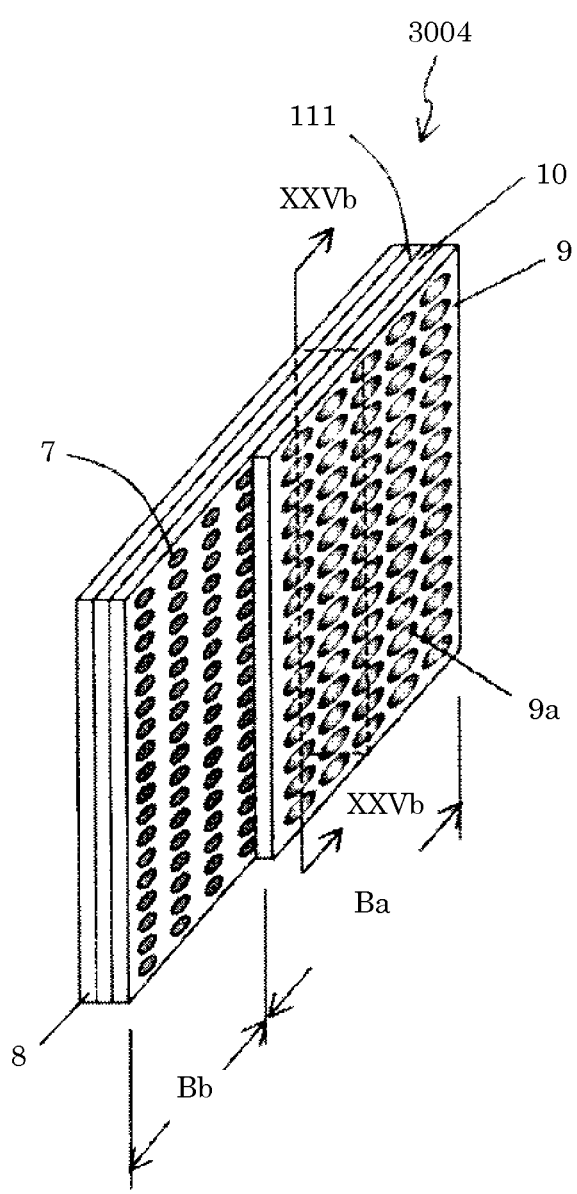
FIG. 25A is a partially cutaway perspective view of a light conversion panel according to Embodiment 3.
Figure 25B:
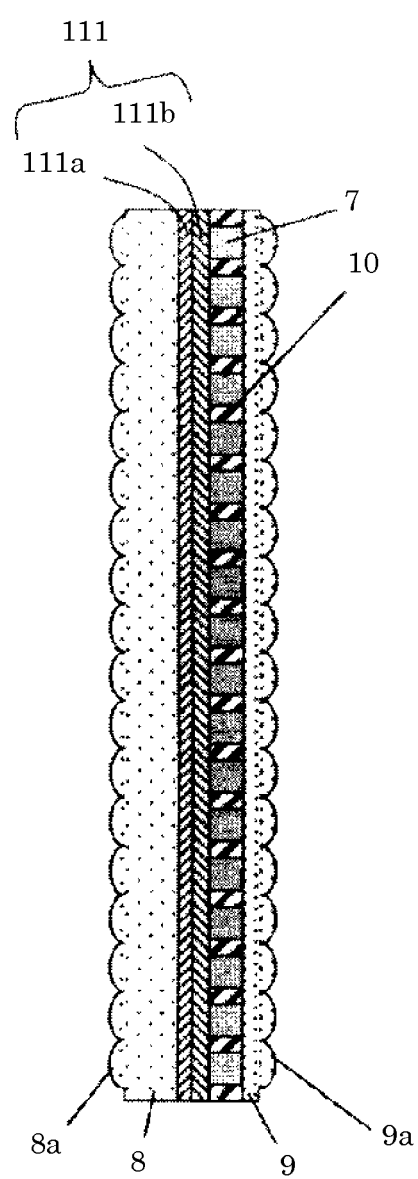
FIG. 25B is a cross-sectional view along line XXVb-XXVb in FIG. 25A.
Figure 26:
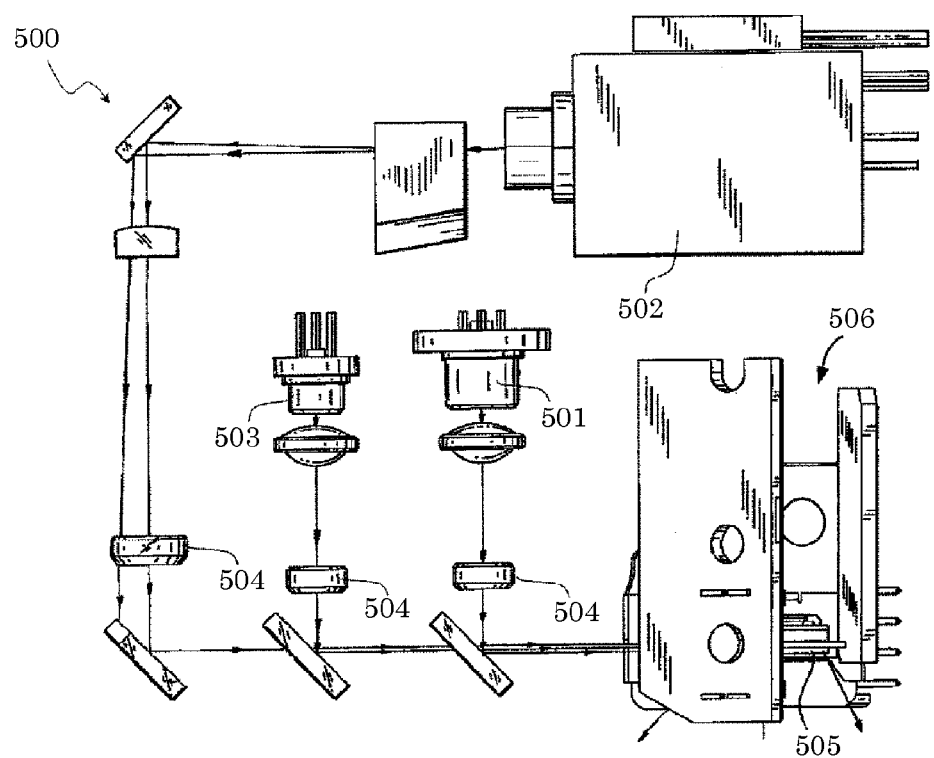
FIG. 26 is a schematic view illustrating the structure of a conventional image display device.
Figure 27:
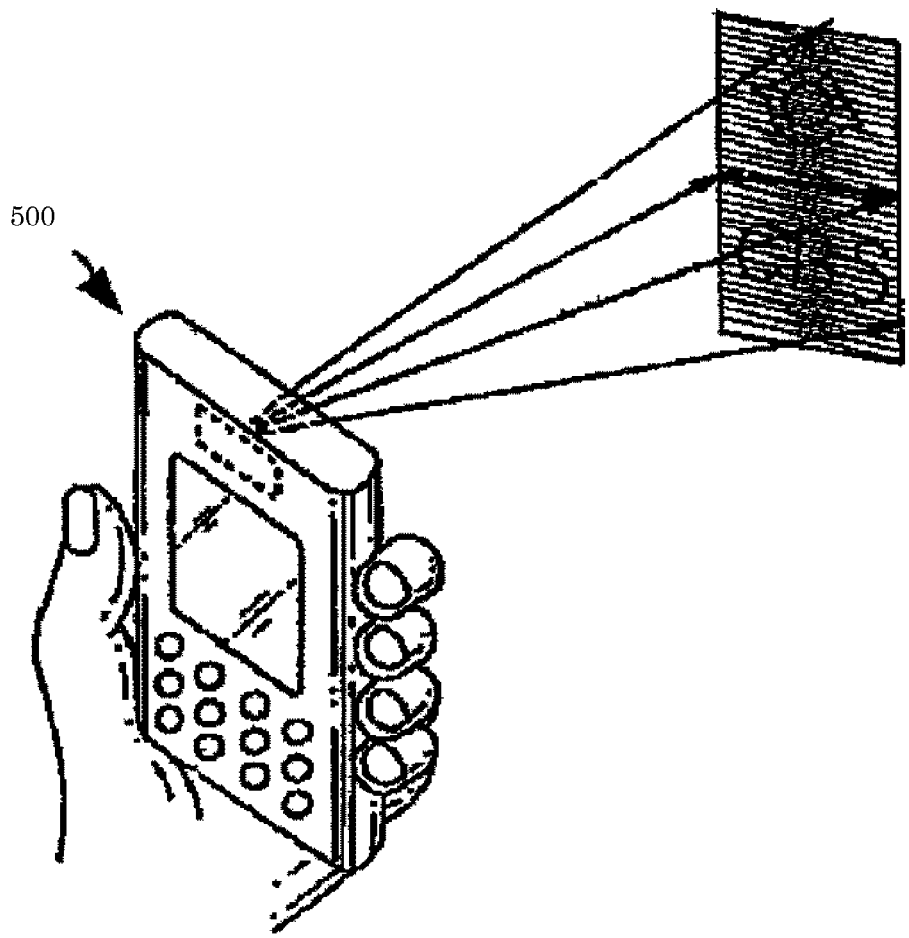
FIG. 27 is a schematic view illustrating the structure of a conventional image display device.

FIG. 25A and FIG. 25B illustrate the structure of light conversion panel 3004, which is the basic structure of light conversion panels 3004A, 3004B, and 3004C. Instead of phosphor layers 7 included in light conversion panel 3004, light conversion panel 3004A includes red phosphor layers 7A which absorb near-ultraviolet light and emit red light, light conversion panel 3004B includes green phosphor layers 7B which absorb near-ultraviolet light and emit green light, and light conversion panel 3004C includes blue phosphor layers 7C which absorb near-ultraviolet light and emit blue light. Accordingly, phosphor layers 7 of light conversion panel 3004 preferably include one type of phosphors, i.e., red phosphor layers 7A, green phosphor layers 7B, or blue phosphor layers 7C. In the present embodiment, red phosphor layers 7A are used for light conversion panel 3004A, green phosphor layers 7B are used for light conversion panel 3004B, and blue phosphor layers 7C are used for light conversion panel 3004C.

Region Ba in FIG. 25A illustrates the surface of light conversion panel 3004 with second microlens array 9 disposed. Region Bb in FIG. 25A illustrates light conversion panel 3004 with second microlens array 9 removed for the purpose of illustration of the present embodiment. FIG. 25B is a schematic cross-sectional view along line XXVb-XXVb in FIG. 25A.

With first two-dimensional image generation unit 3080A that is for red image display and is included in the image display device of the present embodiment, the excitation light emitted from laser source 3001 is scanned over light conversion panel 3004A by deflecting element 3003 and the power of the excitation light emitted from laser source 3001 is changed based on image information. As a result, red image information is emitted from red phosphor layers 7A that are planarly disposed in light conversion panel 3004A. Furthermore, first microlens array 8 disposed on the light-receiving side of light conversion panel 3004A and second microlens array 9 disposed on the light-emission side of light conversion panel 3004A enable efficient conversion from excitation light to fluorescence and enable emission, from light conversion panel 3004A, of the fluorescence having directivity and image information superimposed thereon. Likewise, fluorescence which are green light and blue light having directivity and image information superimposed thereon can also be emitted from light conversion panel 3004B and light conversion panel 3004C, respectively. The fluorescence having red image information, green image information, and blue image information superimposed thereon are multiplexed by multiplexing prism 3200 and projected by projector lens 3005, so that the image display device can efficiently display image information in color with high luminance.

As described in Embodiment 1, including first collimating lens 3102, second collimating lens 3105, imaging lens 3106 having first imaging lens 3106a and second imaging lens 3106b, and capturing lens 3130 makes it easier to design the optical system and enables efficient provision of a high-luminance image display device.

When the image display device is to display images in black and white, the image display device may include one type of two-dimensional image generation unit.

For deflecting elements 3, 23, and 3003 according to Embodiments 1 through 3, a movable reflecting mirror such as a polygon mirror may be used.

INDUSTRIAL APPLICABILITY

The image display device and light conversion panel used in the image display device according to the present disclosure are useful in devices such as portable projectors, stationary projectors, and head-up displays for vehicles.

What is claimed is:
1. An image display device comprising:
   a laser source which emits laser light having a single center wavelength;
   a collecting lens which is disposed on a light-emission side of the laser source and collects the laser light;
   a deflecting element which is disposed on a light-collection side of the collecting lens and scans the laser light;
   a light conversion panel which receives the laser light scanned, converts a wavelength of the laser light, and emits multi-colored fluorescence; and
   a projector lens which projects the light emitted from the light conversion panel,
   wherein the light conversion panel includes a plurality of phosphor layers which are planarly disposed, absorb the laser light having the single center wavelength, and emit the multi-colored fluorescence, wherein the light conversion panel includes a first optical element which guides the laser light to the phosphor layers,
wherein the light conversion panel includes a second optical element which transmits the fluorescence,
wherein the light conversion panel further includes a transparent substrate which is disposed between the phosphor layers and the first optical element and transmits the laser light, and
the first optical element is a first microlens array and the second optical element is a second microlens array, and
the phosphor layers including a red layer, a green layer, and a blue layer,
the red layer absorbs the laser light and emits red light, the green layer absorbs the laser light and emits green light, and the blue layer absorbs the laser light and emits blue light,
the red layer, the green layer, and the blue layer are each linearly disposed,
the first microlens array including a plurality of microlenses formed in dots,
the second microlens array including a plurality of microlenses formed in dots,
the microlenses included in the first microlens array and the microlenses included in the second microlens array are disposed on a plane in correspondence with the lines of the phosphor layers,
three microlenses included in the first microlens array and three microlenses included in the second microlens array disposed in a direction perpendicular to the straight lines correspond to three colors and make up a full-colored unit pixel.

2. The image display device according to claim 1, wherein the light conversion panel includes a spacer between the phosphor layers, the spacer including a high thermal conducting material having a thermal conductivity higher than a thermal conductivity of the phosphor layers.

3. The image display device according to claim 2, wherein the high thermal conducting material includes at least one of zinc oxide, aluminum nitride, and diamond.

4. The image display device according to claim 1, wherein the light conversion panel includes a spacer between the phosphor layers, the spacer including a highly reflective material having a reflectance higher than a reflectance of the phosphor layers.

5. The image display device according to claim 1, wherein the phosphor layers are linearly disposed.

6. The image display device according to claim 1, comprising an imaging lens which forms an image using the fluorescence emitted from the phosphor layers.

7. The image display device according to claim 1,
wherein the laser source emits laser light having the wavelength in a range from 350 nm to 430 nm, and
the red layer is a phosphor layer which emits red light, the green layer is a phosphor layer which emits green light, and the blue layer is a phosphor layer which emits blue light.

8. The image display device according to claim 1,
wherein the laser source emits laser light having the wavelength in a range from 430 nm to 500 nm, and
the red layer is a phosphor layer which emits red light, the green layer is a phosphor layer which emits green light, and the blue layer is a diffusion layer which diffuses the laser light.

9. The image display device according to claim 1, wherein the red layer, the green layer and the blue layer are disposed in parallel straight lines in positions corresponding to microlenses of second microlens array, and the red layer, the green layer and the blue layer are formed in elliptical or circular shapes.

10. An image display device comprising:
a laser source which emits laser light having a single center wavelength;
a collecting lens which is disposed on a light-emission side of the laser source and collects the laser light;
a deflecting element which is disposed on a light-collection side of the collecting lens and scans the laser light;
a light conversion panel which receives the laser light scanned, converts a wavelength of the laser light, and emits multi-colored fluorescence;
a projector lens which projects the light emitted from the light conversion panel; and
a dichroic mirror which transmits the laser light and reflects the fluorescence,
wherein the light conversion panel includes a plurality of phosphor layers which are planarly disposed, absorb the laser light having the single center wavelength, and emit the multi-colored fluorescence,
wherein the light conversion panel includes an optical element which guides the laser light to the phosphor layers,
wherein the light conversion panel further includes a transparent substrate which is disposed between the phosphor layers and the optical element and transmits the laser light, and
the optical element is a microlens array, and
the phosphor layers including a red layer, a green layer, and a blue layer,
the red layer absorbs the laser light and emits red light, the green layer absorbs the laser light and emits green light, and the blue layer absorbs the laser light and emits blue light,
the red layer, the green layer, and the blue layer are each linearly disposed,
the microlens array including a plurality of microlenses formed in dots,
the microlenses included in the microlens array is disposed on a plane in correspondence with the lines of the phosphor layers,
three microlenses included in the microlens array disposed in a direction perpendicular to the straight lines correspond to three colors and make up a full-colored unit pixel,
wherein the dichroic mirror is tilted to a surface of the light conversion panel, the surface is arranged by the microlens array,
the light conversion panel further includes a reflecting layer which reflects the fluorescence emitted from the phosphor layers,
wherein the laser light scanned by the deflecting element passes through the dichroic mirror and enters the light conversion panel,
the laser light which enters the light conversion panel is collected by the microlens array and enters to the phosphor layers,
the fluorescence from the phosphor layers is reflected off the reflecting layer passes through the phosphor layers and the microlens array and emitted from the light conversion panel,
the fluorescence which has emitted from the light conversion panel is reflected off the dichroic mirror and enters to the projector lens.

* * * * *